US008084981B2

(12) United States Patent
Miwa et al.

(10) Patent No.: US 8,084,981 B2
(45) Date of Patent: Dec. 27, 2011

(54) RECHARGEABLE ELECTRIC POWER TOOL

(75) Inventors: Tatsuya Miwa, Maibara (JP); Kazuhiko Nishii, Omihachiman (JP); Atsumasa Kubota, Hikone (JP); Kazuto Toyama, Hikone (JP); Masaki Ikeda, Hikone (JP)

(73) Assignee: Panasonic Electric Works Power Tools Co., Ltd., Hikone, Shiga (JP)

( * ) Notice: Subject to any disclaimer, the term of this patent is extended or adjusted under 35 U.S.C. 154(b) by 261 days.

(21) Appl. No.: 12/591,133

(22) Filed: Nov. 10, 2009

(65) Prior Publication Data
US 2010/0117580 A1    May 13, 2010

(30) Foreign Application Priority Data

Nov. 10, 2008    (JP) .................................. 2008-288074

(51) Int. Cl.
*H02H 7/085* (2006.01)
(52) U.S. Cl. ......... 318/472; 318/473; 318/471; 318/445
(58) Field of Classification Search .................. 318/472, 318/471, 473, 445
See application file for complete search history.

(56) References Cited

U.S. PATENT DOCUMENTS

| 6,170,241 | B1 * | 1/2001 | Shibilski et al. ............... 56/11.9 |
| 7,095,235 | B2 | 8/2006 | Fiebig et al. |
| 7,551,411 | B2 * | 6/2009 | Woods et al. ................... 361/33 |
| 2007/0193762 | A1 | 8/2007 | Arimura et al. |

FOREIGN PATENT DOCUMENTS

| JP | 11-341850 | 12/1999 |
| JP | 2000-217383 | 8/2000 |
| JP | 2003-339187 | 11/2003 |
| JP | 2003311655 | 11/2003 |
| JP | 2006-166601 | 6/2006 |
| JP | 2006-247821 | 9/2006 |
| JP | 2006-272485 | 10/2006 |
| JP | 2007-222991 | 9/2007 |

OTHER PUBLICATIONS

The Japanese office action dated Feb. 22, 2011 and English summary thereof, 5 pages total.
The Japanese Office Action dated Sep. 21, 2010 and English summary thereof.

* cited by examiner

*Primary Examiner* — Bentsu Ro
*Assistant Examiner* — David Luo
(74) *Attorney, Agent, or Firm* — Bacon & Thomas, PLLC

(57) ABSTRACT

In a rechargeable electric power tool, upon changeover of a trigger switch, a microcomputer determines the magnitude relation between the detected temperature outputted from the first thermistor and the first temperature threshold value, the second temperature threshold value and the third temperature threshold value, and the magnitude relation between the first calculated temperature increase rate and the first preset temperature increase rate. If the detected temperature is determined to be greater than the first temperature threshold value or if the first calculated temperature increase rate is determined to be greater than the first preset temperature increase rate after the detected temperature has been determined to be greater than the second temperature threshold value, the microcomputer is set in a limited operation mode in which the revolution number of the motor is limited to a predetermined value or less.

8 Claims, 8 Drawing Sheets

RECHARGEABLE ELECTRIC POWER TOOL

FIELD OF THE INVENTION

The present invention relates to a rechargeable electric power tool.

BACKGROUND OF THE INVENTION

Conventionally, there is known a rechargeable electric power tool used as an electric driver or the like, which includes a motor driven by the electric power supplied from a rechargeable battery pack, a field effect transistor (FET) serving as a switching element for regulating power distribution to the motor and a microcomputer for controlling rotation of the motor through the FET.

In the rechargeable electric power tool of this kind, the motor is rotationally driven at the maximum output power by switching on the FET and is stopped by switching off the FET. The revolution number of the motor is controlled by driving the FET through pulse width modulation (PWM).

As one example of the rechargeable electric power tool, there has been proposed an electric power tool of the type in which a temperature sensor is arranged in the battery cell of a battery pack. The temperature of the battery cell is detected by a temperature detecting circuit connected to the temperature sensor. If the temperature thus detected is high, a microcomputer restricts rotation of the motor or forcibly stops the motor in order to prevent thermal degradation of the battery cell (see, e.g., Japanese Patent Laid-open Publication No. 2007-222991).

In this rechargeable electric power tool, however, it is sometimes the case that the coil or case of the motor grows hot and generates smoke, if the motor is in an overload state by being kept in a locked state due to the generation of increased torque (electric current) or by being continuously driven at a low current for a prolonged period of time, as in the case where a bolt is driven into a hard object by the electric power tool. It is difficult to grasp this phenomenon with the battery cell temperature detecting technology mentioned above, particularly when the temperature of the battery cell is not yet increased immediately after replacement of the battery pack. Measures against this situation have been taken by, e.g., increasing the heat resistance of the motor. However, such measures may sometimes be insufficient if the electric power tool is used under an exceptionally harsh condition.

Owing to its inexpensiveness, an inner coil type motor (namely, a motor having a rotor wound with a coil) is often used in a rechargeable electric power tool. In this motor, it may be conceivable that the temperature of the rotor of the motor is directly detected by a rotor temperature detection unit instead of detecting the temperature of a battery pack, in which case a microcomputer restricts rotation of the motor based on the temperature thus detected. Since the rotor is a rotating body, however, it is almost impossible to detect the temperature of the rotor. Due to the large heat capacity of a motor case, it is sometimes the case that smoke generation occurs in the motor case before the temperature of the rotor grows high.

SUMMARY OF THE INVENTION

In view of the above, the present invention provides a rechargeable electric power tool capable of preventing a motor from falling into an overload state.

In accordance with a first aspect of the invention, there is provided a rechargeable electric power tool including a motor driven by a secondary battery as a power source, a switching element for regulating power supplied to the motor, a motor control unit for controlling rotation of the motor through the switching element, a lead wire for supplying a drive current to the motor therethrough and a trigger switch changed over by a user for turning on or off the drive current supplied to the motor through the lead wire, wherein a first temperature detection unit is arranged on the lead wire and a first temperature threshold value $T_{th1}$, a second temperature threshold value $T_{th2}$ lower than the $T_{th1}$, a first preset temperature increase rate $(\Delta T/\Delta t)_{s1}$ and a third temperature threshold value $T_{th3}$ lower than the $T_{th2}$ are set for the first temperature detection unit, wherein, based on a temperature detection signal outputted from the first temperature detection unit, the motor control unit calculates a first calculated temperature increase rate $(\Delta T/\Delta t)$ by dividing a temperature elevation degree $\Delta T$ by a lapse time $\Delta t$, wherein, upon changeover of the trigger switch, the motor control unit determines magnitude relations between a detected temperature $T_1$ corresponding to the temperature detection signal outputted from the first temperature detection unit and the $T_{th1}$, the $T_{th2}$ and the $T_{th3}$, and a magnitude relation between the $(\Delta T/\Delta t)$ and the $(\Delta T/\Delta t)_{s1}$, wherein, if the detected temperature $T_1$ is determined to be greater than the $T_{th1}$ or if the $(\Delta T/\Delta t)$ is determined to be greater than the $(\Delta T/\Delta t)_{s1}$ after the detected temperature $T_1$ has been determined to be greater than the $T_{th2}$, the motor control unit is set in a limited operation mode in which the motor control unit stops rotation of the motor or in which the revolution number of the motor is limited to a predetermined value or less, and wherein, if the detected temperature $T_1$ is determined to be smaller than the $T_{th3}$, the motor control unit releases the limited operation mode.

The configuration noted above has the following advantageous effect. In the normal operation mode in which the motor is normally controlled through the switching element and upon changeover of the trigger switch, if the detected temperature $T_1$ is determined to be greater than the first temperature threshold value $T_{th1}$ or if the first calculated temperature increase rate $(\Delta T/\Delta t)$ is determined to be greater than the first preset temperature increase rate $(\Delta T/\Delta t)_{s1}$ after the detected temperature $T_1$ has been determined to be greater than the second temperature threshold value $T_{th2}$, the motor control unit decides that the motor may fall into an overload state. Thus, the motor control unit is set in the limited operation mode in which the motor control unit stops rotation of the motor or in which the revolution number of the motor is limited to a predetermined value or less. Thanks to this feature, the motor is stopped or otherwise limited in its rotation before it actually falls into an overload state. This assists in preventing occurrence of trouble such as smoke generation or the like in the motor. In addition, the first temperature detection unit is arranged on the lead wire through which to supply an electric current to the coil of the motor. This assures enhanced heat transfer from the coil as a heat source to the first temperature detection unit and makes it possible to detect the temperature of the coil with increased temperature-following capability. Therefore, the determination criteria for setting the motor control unit in the limited operation mode include not only the determination that the detected temperature $T_1$ is greater than the first temperature threshold value $T_{th1}$ but also the magnitude relation between the first calculated temperature increase rate $(\Delta T/\Delta t)$ and the first preset temperature increase rate $(\Delta T/\Delta t)_{s1}$ after the detected temperature $T_1$ has been determined to be greater than the second temperature threshold value $T_{th2}$. As a consequence, the motor control unit is set in the limited operation mode not only when the detected temperature $T_1$ exceeds the first temperature threshold value $T_{th1}$ but also when a sharp increase in the temperature of the coil (or the motor) is detected. This makes it possible to effectively prevent the motor from falling into an overload state. The motor control unit returns to the normal operation mode if the detected temperature $T_1$ is determined to be smaller than the third temperature threshold value $T_{th3}$. This eliminates the possibility of impairing the handling property of the rechargeable electric power tool.

In the rechargeable electric power tool, a switch block for accommodating the trigger switch and the first temperature detection unit may be arranged in a contact point portion between the lead wire and the switch block.

With the configuration noted above, it is possible to reliably attach the first temperature detection unit to the contact point portion between the lead wire and the switch block.

In the rechargeable electric power tool, the motor may include a rotor, a coil, a stator and a motor case for accommodating the rotor, the coil and the stator, wherein a second temperature detection unit in which are set a first temperature threshold value $T_{tha}$, a second temperature threshold value $T_{thb}$ lower than the first temperature threshold value $T_{tha}$ by a preset temperature difference $\Delta T_{sa}$, a first preset temperature increase rate $(\Delta T/\Delta t)_{s2}$ and a third temperature threshold value $T_{thc}$ lower than the second temperature threshold value $T_{thb}$ by a preset temperature difference $\Delta T_{sb}$ is arranged in the motor case, wherein, based on a temperature detection signal outputted from the second temperature detection unit, the motor control unit calculates a second calculated temperature increase rate $(\Delta T/\Delta t)$ by dividing a temperature elevation degree $\Delta T$ by a lapse time $\Delta t$, wherein, upon changeover of the trigger switch, the motor control unit determines the magnitude relation between the detected temperature $T_1$ corresponding to the temperature detection signal outputted from the first temperature detection unit and the first temperature threshold value $T_{th1}$ the second temperature threshold value $T_{th2}$ and the third temperature threshold value $T_{th3}$, the magnitude relation between the first calculated temperature increase rate $(\Delta T/\Delta t)$ and the first preset temperature increase rate $(\Delta T/\Delta t)_{s1}$, the magnitude relation between the detected temperature $T_2$ corresponding to the temperature detection signal outputted from the second temperature detection unit and the first temperature threshold value $T_{tha}$, the second temperature threshold value $T_{thb}$ and the third temperature threshold value $T_{thd}$, and the magnitude relation between the second calculated temperature increase rate $(\Delta T/\Delta t)$ and the first preset temperature increase rate $(\Delta T/\Delta t)_{s2}$, wherein, if the detected temperature $T_1$ is determined to be equal to or greater than the first temperature threshold value $T_{th1}$ or the detected temperature $T_2$ is determined to be equal to or greater than the first temperature threshold value $T_{tha}$, or if the first calculated temperature increase rate $(\Delta T/\Delta t)$ is determined to be equal to or greater than the first preset temperature increase rate $(\Delta T/\Delta t)_{s1}$ after the detected temperature $T_1$ has been determined to be equal to or greater than the second temperature threshold value $T_{th2}$ or the second calculated temperature increase rate $(\Delta T/\Delta t)$ is determined to be equal to or greater than the first preset temperature increase rate $(\Delta T/\Delta t)_{s2}$ after the detected temperature $T_2$ has been determined to be equal to or greater than the second temperature threshold value $T_{thb}$, the motor control unit sets itself in the limited operation mode, and wherein, if the detected temperature $T_1$ is determined to be smaller than the third temperature threshold value $T_{th3}$ and if the detected temperature $T_2$ is determined to be smaller than the third temperature threshold value $T_{thc}$, the motor control unit releases the limited operation mode.

The configuration noted above has the following advantageous effect. Upon changeover of the trigger switch, if the detected temperature $T_1$ is determined to be greater than the first temperature threshold value $T_{th1}$ or the detected temperature $T_2$ is determined to be greater than the first temperature threshold value $T_{tha}$, or if the first calculated temperature increase rate $(\Delta T/\Delta t)$ is determined to be greater than the first preset temperature increase rate $(\Delta T/\Delta t)_{s1}$ after the detected temperature $T_1$ has been determined to be greater than the second temperature threshold value $T_{th2}$ or the second calculated temperature increase rate $(\Delta T/\Delta t)$ is determined to be greater than the first preset temperature increase rate $(\Delta T/\Delta t)_{s2}$ after the detected temperature $T_2$ has been determined to be greater than the second temperature threshold value $T_{thb}$, the motor control unit decides that the motor may fall into an overload state. Thus, the motor control unit is set in the limited operation mode in which the motor control unit stops rotation of the motor or in which the revolution number of the motor is limited to a predetermined value or less. Thanks to this feature, the motor is stopped or otherwise limited in its rotation before it actually falls into an overload state. This assists in preventing occurrence of trouble such as smoke generation or the like in the motor. Therefore, the determination criteria for setting the motor control unit in the limited operation mode include not only the determination that the detected temperature $T_1$ is greater than the first temperature threshold value $T_{th1}$ and the determination that the detected temperature $T_2$ is greater than the first temperature threshold value $T_{tha}$ but also the magnitude relation between the first calculated temperature increase rate $(\Delta T/\Delta t)$ and the first preset temperature increase rate $(\Delta T/\Delta t)_{s1}$ after the detected temperature $T_1$ has been determined to be greater than the second temperature threshold value $T_{th2}$ and the magnitude relation between the second calculated temperature increase rate $(\Delta T/\Delta t)$ and the first preset temperature increase rate $(\Delta T/\Delta t)_{s2}$ after the detected temperature $T_2$ has been determined to be greater than the second temperature threshold value $T_{thb}$. During the different use of the rechargeable electric power tool such as the use of the motor in a locked state or the continuous use of the motor at a low current, therefore, the motor control unit is set in the limited operation mode not only when the detected temperature $T_1$ exceeds the first temperature threshold value $T_{th1}$ or the detected temperature $T_2$ exceeds the first temperature threshold value $T_{tha}$ but also when a sharp increase in the temperature of the coil (or the motor) is detected in the temperature range equal to or higher than the second temperature threshold value $T_{th2}$ or $T_{thb}$. This makes it possible to effectively prevent the motor from falling into an overload state. The motor control unit returns to the normal operation mode if the detected temperature $T_1$ is determined to be smaller than the third temperature threshold value $T_{th3}$ or if the detected temperature $T_2$ is determined to be smaller than the third temperature threshold value $T_{thc}$. This eliminates the possibility of impairing the handling property of the rechargeable electric power tool.

In the rechargeable electric power tool, fourth temperature threshold values $T_{th4}$ and $T_{thd}$ respectively higher than the second temperature threshold values $T_{th2}$ and $T_{thb}$ but lower than the first temperature threshold values $T_{th1}$ and $T_{tha}$ and second preset temperature increase rates $(\Delta T/\Delta t)_{s11}$ and $(\Delta T/\Delta t)_{s12}$ respectively smaller than the first preset temperature increase rates $(\Delta T/\Delta t)_{s1}$ and $(\Delta T/\Delta t)_{s2}$ may set in the first temperature detection unit and the second temperature detection unit, wherein, upon changeover of the trigger switch, the motor control unit determines the magnitude relation between the detected temperatures $T_1$ and $T_2$ corresponding to the temperature detection signals outputted from the first temperature detection unit and the second temperature detection unit and the fourth temperature threshold values $T_{th4}$ and $T_{thd}$, and the magnitude relation between the first and second calculated temperature increase rates ($\Delta T/\Delta t$) and the second preset temperature increase rates $(\Delta T/\Delta t)_{s11}$ and $(\Delta T/\Delta t)_{s12}$, wherein, if the first calculated temperature increase rate ($\Delta T/\Delta t$) is determined to be equal to or greater than the second preset temperature increase rate $(\Delta T/\Delta t)_{s11}$ after the detected temperature $T_1$ has been determined to be equal to or greater than the fourth temperature threshold value $T_{th4}$ or if the second calculated temperature increase rate ($\Delta T/\Delta t$) is determined to be equal to or greater than the second preset temperature increase rate $(\Delta T/\Delta t)_{s12}$ after the detected temperature $T_2$ has been determined to be equal to or greater than the fourth temperature threshold value $T_{thd}$, the motor control unit sets itself in the limited operation mode, and wherein, if the detected temperature $T_1$ is determined to be smaller than the third temperature threshold value $T_{th3}$ and if the detected temperature $T_2$ is determined to be smaller than the third temperature threshold value $T_{thc}$, the motor control unit releases the limited operation mode.

The configuration noted above has the following advantageous effect. Upon changeover of the trigger switch, if the first calculated temperature increase rate ($\Delta T/\Delta t$) is determined to be greater than the second preset temperature increase rate $(\Delta T/\Delta t)_{s11}$ after the detected temperature $T_1$ has been determined to be greater than the fourth temperature threshold value $T_{th4}$ or if the second calculated temperature increase rate ($\Delta T/\Delta t$) is determined to be greater than the second preset temperature increase rate $(\Delta T/\Delta t)_{s12}$ after the detected temperature $T_2$ has been determined to be greater than the fourth temperature threshold value $T_{thd}$, the motor control unit is set in the limited operation mode. As compared to the configuration of claim 3, the determination criteria for setting the motor control unit in the limited operation mode further include the magnitude relation between the first calculated temperature increase rate ($\Delta T/\Delta t$) and the second preset temperature increase rate $(\Delta T/\Delta t)_{s11}$ after the detected temperature $T_1$ has been determined to be greater than the fourth temperature threshold value $T_{th4}$ and the magnitude relation between the second calculated temperature increase rate ($\Delta T/\Delta t$) and the second preset temperature increase rate $(\Delta T/\Delta t)_{s12}$ after the detected temperature $T_2$ has been determined to be greater than the fourth temperature threshold value $T_{thd}$. Unlike the configuration of claim 3, the motor control unit is more rapidly set in the limited operation mode when a sharp increase in the temperature of the coil (or the motor) is detected in the temperature range between the fourth temperature threshold value $T_{th4}$ or $T_{thd}$ and the first temperature threshold value $T_{th1}$ or $T_{tha}$ than when a sharp increase in the temperature of the coil (or the motor) is detected in the temperature range between the second temperature threshold value $T_{th2}$ or $T_{thb}$ and the fourth temperature threshold value $T_{th4}$ or $T_{thd}$. This makes it possible to more effectively prevent the motor from falling into an overload state.

With the present invention, it is possible to provide a rechargeable electric power tool capable of preventing a motor from falling into an overload state.

DETAILED DESCRIPTION OF THE PREFERRED EMBODIMENTS

Hereinafter, embodiments of the present invention will be described with reference to the accompanying drawings.

First Embodiment

Figure 1A:
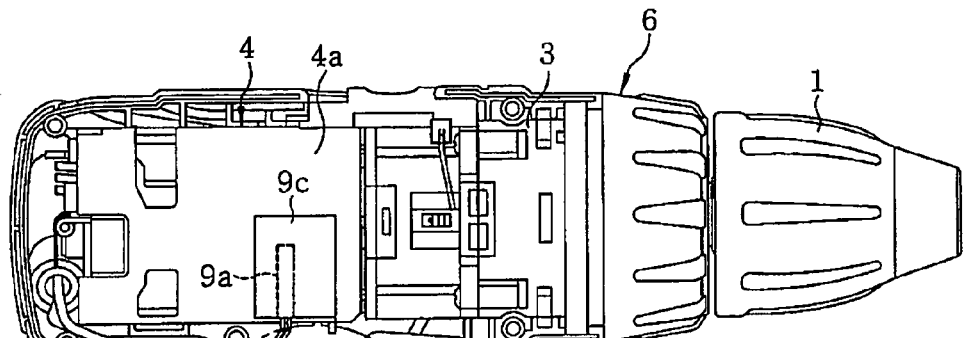
FIG. 1A is a structural view showing a rechargeable electric power tool in respect of the respective embodiments of the present invention.

Referring to FIG. 1A, a rechargeable electric power tool in accordance with the present embodiment is used as an electric driver. The power tool includes a rotary output portion 1 for holding a tip driver tool, a motor 4 for driving the rotary output portion 1 through a gear box 3 as a speed reducer, a battery pack 2, i.e., a secondary battery, used as a driving power source for the motor 4, and a trigger switch 5 changed over (turned on or off) by the user's operation of a trigger lever 5a for switching on or off the rotational operation of the motor 4.

The motor 4 is accommodated within a tool body 6. The battery pack 2 is removably mounted to a battery pack mounting portion 6c provided at the lower end of a grip portion 6a of the tool body 6. The trigger switch 5 is held within a resin-made switch block 8 provided in the tool body 6. Six (a plurality of) battery cells 2a are housed within the battery pack 2 in a serially connected state. With the rechargeable electric power tool shown in FIG. 1A, a circuit board 6b is arranged near the lower end of the grip portion 6a of the tool body 6.

The motor 4 is a DC motor of well-known configuration in which an electric current is supplied to a coil through a brush and a commutator. The motor 4 is provided with a substantially cylindrical motor case 4a for holding therein the brush with a terminal, the commutator, the coil, a rotor and a stator (all of which are not shown in the drawings).

Electrically connected to the motor 4 is a lead wire 7 through which an electric current is supplied from the battery pack 2 to the motor 4 via the trigger switch 5. The lead wire 7 is electrically connected to a switch block 8 and a contact point portion 7a. Upon operating the trigger lever 5a, the trigger switch 5 turns on or off the electric power (or the electric current) supplied to the motor 4 (namely, the coil of the motor 4) through the lead wire 7. In the motor 4 shown in FIG. 1A, the lead wire 7 is electrically connected to the coil through the terminal of the brush and the commutator.

In the rechargeable electric power tool of the present embodiment, a first thermistor 9 serving as a first temperature detection unit is arranged in the contact point portion 7a shown in FIG. 1A. Since the first thermistor 9 is arranged on the lead wire 7 for supplying an electric current to the coil of the motor 4 therethrough, the heat generated in the coil of the motor 4 is well transferred to the first thermistor 9. This makes it possible to detect the temperature of the motor 4 with enhanced temperature-following capability.

Figure 1B:
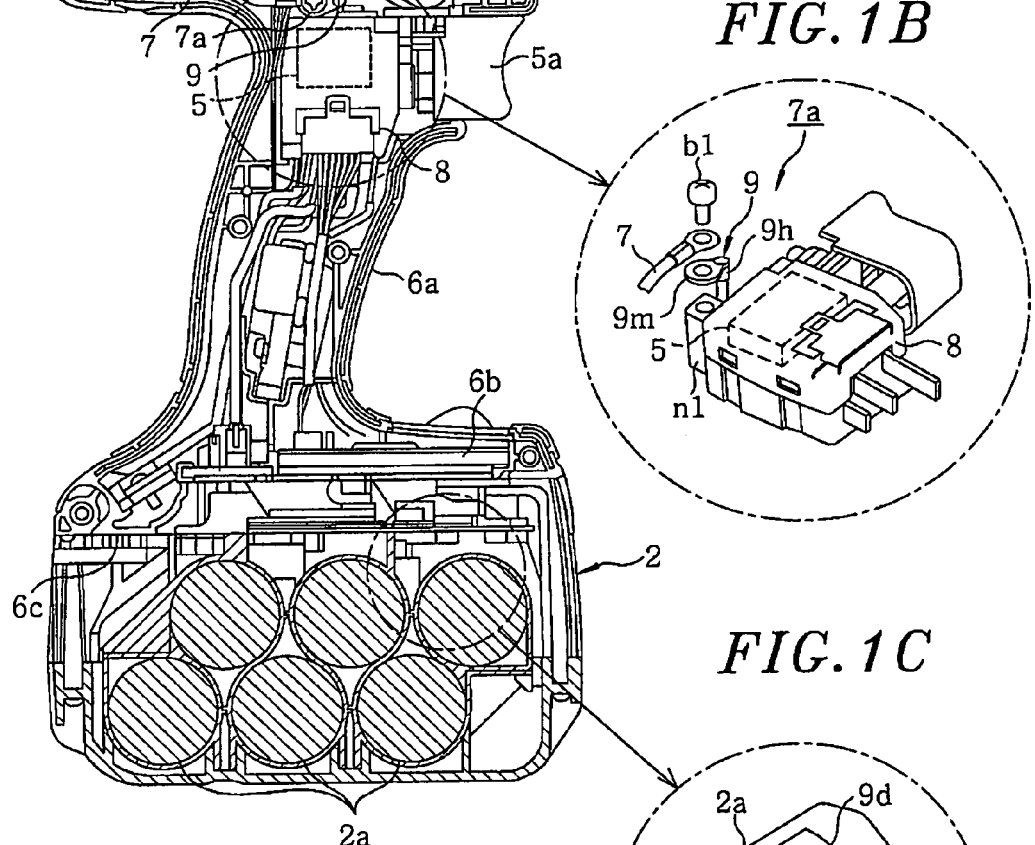
FIG. 1B is an enlarged view showing an attachment portion (or a contact point portion) for a first thermistor in the rechargeable electric power tool.

More specifically, as shown in FIG. 1B, the first thermistor 9 is an NTC thermistor provided with a thermistor body 9h and an annular terminal 9m. The thermistor body 9h is fixed (or screw-fixed) to the contact point portion 7a by virtue of the annular terminal 9m. The screw-fixing makes it easy to attach the first thermistor 9 to the contact point portion 7a and keeps the first thermistor 9 in a stably fixed state after its attachment. This makes it possible to reliably detect the temperature while utilizing the advantages, e.g., reduced size, of the NTC thermistor.

Figure 1C:
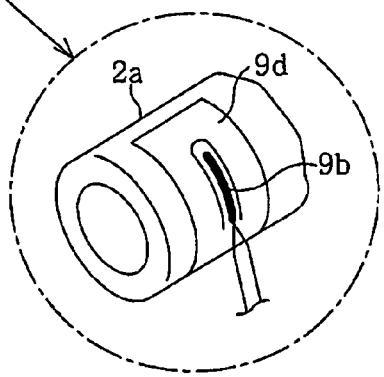
FIG. 1C is an enlarged view showing an attachment portion for a third thermistor in a battery pack (or a battery cell) of the rechargeable electric power tool.

In the rechargeable electric power tool of the present embodiment, a second thermistor 9a formed of an NTC thermistor and serving as a second temperature detection unit is attached to the motor case 4a by an adhesive tape 9c as shown in FIG. 1A so that it can detect the temperature of the motor case 4a. In addition, a third thermistor 9b formed of an NTC thermistor and serving as a third temperature detection unit is attached to the battery cell 2a of the battery pack 2 by an adhesive tape 9d as shown in FIG. 1C so that it can detect the temperature of the battery cell 2a of the battery pack 2.

Figure 2:
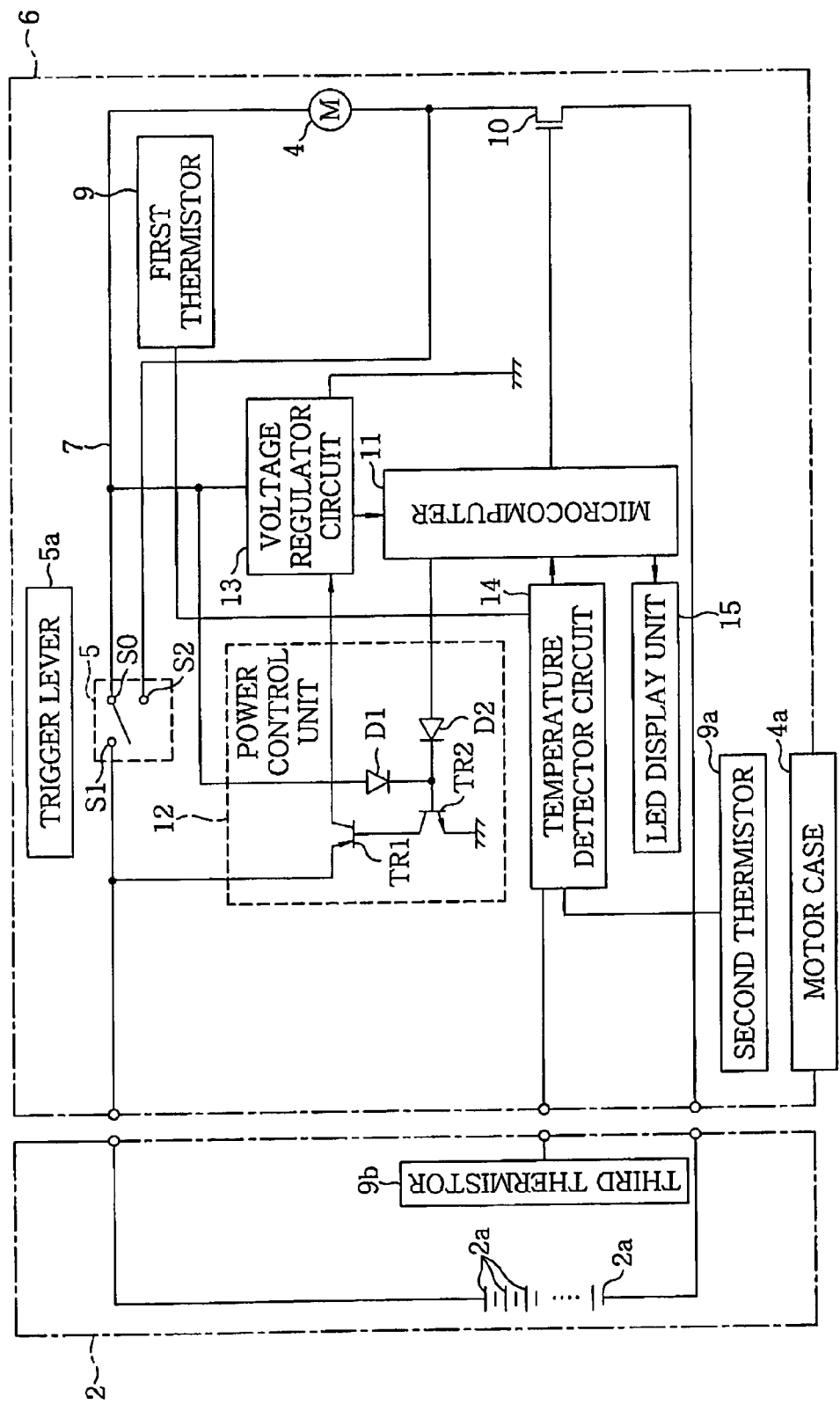
FIG. 2 is a functional block diagram illustrating the electric configuration of the rechargeable electric power tool in respect of the respective embodiments of the present invention.

Referring to FIG. 2, the rechargeable electric power tool of the present embodiment includes a FET (field effect transistor) 10 as a switching element for regulating power supplied to the motor 4 and a microcomputer 11 as a motor control unit for controlling the rotation of the motor 4 through the FET 10. The FET 10 and the microcomputer 11 are arranged in the tool body 6. The rechargeable electric power tool further includes the battery pack 2 having six (a plurality of) battery cells 2a serially connected to one another.

More specifically, the microcomputer 11 drives the motor 4 to rotate at the greatest output power by switching on the FET 10 and stops the rotation of the motor 4 by switching off the FET 10. Furthermore, the microcomputer 11 controls the revolution number of the motor 4 by driving the FET through pulse width modulation (PWM). In case where the tip driver tool (or the motor 4) needs to be driven with an increased torque, the microcomputer 11 automatically increases the duty ratio of the FET 10 through the use of a well-known control system not shown in FIG. 2, thereby increasing the electric current supplied to the motor 4 and consequently augmenting the torque.

As shown in FIG. 2, the trigger switch 5 includes a first fixed contact point S1 connected to the positive pole of the battery pack 2, a second fixed contact point S2 connected between the output terminal of the motor 4 and the FET 10, and a movable contact point S0 connected to the input terminal of the motor 4. If the trigger switch 5 is turned on by operating the trigger lever 5a, the movable contact point S0 is connected to the first fixed contact point S1. If the trigger switch 5 is turned off, the movable contact point S0 is connected to the second fixed contact point S2.

Electrically connected to the microcomputer 11 are a power control unit 12 for controlling the electric power supplied from the battery pack 2 and a voltage regulator circuit (or a regulator) 13 for making the voltage outputted from the battery pack 2 and the power control unit 12 suitable for use in the microcomputer 11. The voltage regulator circuit 13 is connected to the movable contact point S0 of the trigger switch 5. A temperature detection circuit 14 and an LED display unit 15 as a notification unit are electrically connected to the microcomputer 11. The LED display unit 15 is lighted (turned on to emit light) or extinguished in response to the lighting control signal fed from the microcomputer 11.

The power control unit 12 includes a pnp transistor TR1, an npn transistor TR2 and diodes D1 and D2. The transistor TR1 has a emitter terminal connected to the positive pole of the battery pack 2, a base terminal connected to the collector terminal of the transistor TR2, and an collector terminal connected to the voltage regulator circuit 13. The transistor TR2 has an emitter terminal kept grounded and a base terminal connected to the microcomputer 11 via the diode D2 and also connected to the movable contact point S0 via the diode D1.

The battery pack 2 is mounted to the tool body 6 as set forth above. If the trigger lever 5a is operated to turn on the trigger switch 5, the electric power supplied from the battery pack 2 is regulated into a constant voltage of high level (e.g., 5 V) by the voltage regulator circuit 13. The constant voltage of high level is inputted to the microcomputer 11 and also applied to the base terminal of the transistor TR2.

When the trigger switch 5 is turned on, an operation control signal is outputted from a lever operation detecting circuit (not shown). The lever operation detecting circuit is arranged in the trigger lever 5a to detect the operation amount (or push-in amount) of the latter. The operation control signal is inputted to the microcomputer 11 through the voltage regulator circuit 13. Responsive to the operation control signal, the microcomputer 11 applies a voltage of high level to the base terminal of the transistor TR2 via the diode D2.

Then, the transistor TR2 is switched on and the transistor TR1 is also switched on. Consequently, an electric power is supplied from the battery pack 2 to the microcomputer 11 via the transistor TR1 and the voltage regulator circuit 13, thereby bringing the microcomputer 11 into a power-on state.

At this moment, since the microcomputer 11 is applying a voltage of high level to the base terminal of the transistor TR2 via the diode D2, the transistor TR2 remains switched on unless the microcomputer 11 applies a voltage of low level (e.g., 0 V) thereto. In other words, the transistor TR2 and the transistor TR1 are switched off if a voltage of low level is applied from the microcomputer 11 to the transistor TR2. This stops the power supply from the battery pack 2 to the microcomputer 11 via the transistor TR1, thereby cutting off the power of the microcomputer 11.

During the time when a voltage of high level is applied to the base terminal of the transistor TR2, the voltage regulator circuit 13 continues to supply a voltage (5 V) to the microcomputer 11 via the transistor TR1 even if the trigger lever 5a is operated to turn off the trigger switch 5.

Even when the trigger switch 5 is turned off, a voltage of high level continues to be applied from the microcomputer 11 to the transistor TR2 for about one minute. Thus, the control operation of the LED display unit 15 and other operations are continuously performed for that time period. After about one minute has lapsed, a voltage of low level is automatically applied from the microcomputer 11 to the transistor TR2, thereby switching off the transistors TR2 and TR1 and stopping the power supply from the battery pack 2 to the microcomputer 11. As a result, the microcomputer 11 ceases to operate.

In the rechargeable electric power tool of the present embodiment, the first thermistor 9 (see FIG. 1) arranged in the contact point portion 7a between the lead wire 7 and the switch block 8 is connected to the microcomputer 11 via the temperature detection circuit 14. In the temperature detection circuit 14, the resistance value of the first thermistor 9 varying with the temperature thereof is converted to a voltage signal as a temperature detection signal which in turn is inputted to the microcomputer 11. The voltage signal is then subjected to a specified A/D conversion process in the microcomputer 11 and is converted to a detected temperature T1 (deg) of the lead wire 7 in the contact point portion 7a.

In addition to the first thermistor 9, the second thermistor 9a arranged in the motor case 4a and the third thermistor 9b arranged in the battery cell 2a of the battery pack 2 are electrically connected to the temperature detection circuit 14 (see FIG. 1). As in the first thermistor 9, the resistance values of the second and third thermistors 9a and 9b are respectively converted to voltage signals (or temperature detection signals) by the temperature detection circuit 14. In the microcomputer 11, these voltage signals are respectively converted to a detected temperature T2 (deg) of the motor case 4a and a detected temperature T3 (deg) of the battery cell 2a.

In the rechargeable electric power tool of the present embodiment, the FET 10, the microcomputer 11, the power control unit 12, the voltage regulator circuit 13, the temperature detection circuit 14 and the LED display unit 15 are mounted to or formed on the circuit board 6b (see FIG. 1) held within the grip portion 6a of the tool body 6.

The rechargeable electric power tool of the present embodiment is constructed as above. For the first thermistor 9 arranged on the lead wire 7, there are set a first temperature threshold value $T_{th1}$, a second temperature threshold value $T_{th2}$ lower than the first temperature threshold value $T_{th1}$ by a preset temperature difference $\Delta T_{s1}$, a first preset temperature increase rate $(\Delta T/\Delta t)_{s1}$ and a third temperature threshold value $T_{th3}$ lower than the second temperature threshold value $T_{th2}$ by a preset temperature difference $\Delta T_{s2}$.

Based on the temperature detection signal outputted from the first thermistor 9, the microcomputer 11 calculates a calculated temperature increase rate $(\Delta T/\Delta t)$ by dividing a temperature elevation degree $\Delta T$ by a lapse time $\Delta t$. Upon changeover of the trigger switch 5, the microcomputer 11 determines the magnitude relation between the detected temperature $T_1$ corresponding to the temperature detection signal outputted from the first thermistor 9 and the first temperature threshold value $T_{th1}$, the second temperature threshold value $T_{th2}$ and the third temperature threshold value $T_{th3}$, and the magnitude relation between the calculated temperature increase rate $(\Delta T/\Delta t)$ and the first preset temperature increase rate $(\Delta T/\Delta t)_{s1}$. If the detected temperature $T_1$ is determined to be greater than the first temperature threshold value $T_{th1}$ or if the calculated temperature increase rate $(\Delta T/\Delta t)$ is determined to be greater than the first preset temperature increase rate $(\Delta T/\Delta t)_{s1}$ after the detected temperature $T_1$ has been determined to be greater than the second temperature threshold value $T_{th2}$ when it is not greater than the first temperature threshold value $T_{th1}$, the microcomputer 11 decides that the motor 4 may fall into an overload state and changes the duty ratio of the FET 10 to thereby establish a limited operation mode in which the revolution number of the motor 4 is limited to a predetermined value or less regardless of the pushed amount of the trigger lever 5a.

In the present embodiment, it is preferred that the first preset temperature increase rate $(\Delta T/\Delta t)_{s1}$ is set equal to or greater than 2 degrees/sec but smaller than 4 degrees/sec.

In the limited operation mode and upon changeover of the trigger switch 5, the microcomputer 11 determines the magnitude relation between the detected temperature $T_1$ and the third temperature threshold value $T_{th3}$. If the detected temperature $T_1$ is determined to be smaller than the third temperature threshold value $T_{th3}$, the microcomputer 11 releases the limited operation mode and returns to a normal operation mode in which the rotation of the motor 4 is not limited at all and normally controlled depending on the pushed amount of the trigger lever 5a by the FET 10.

Figure 3:
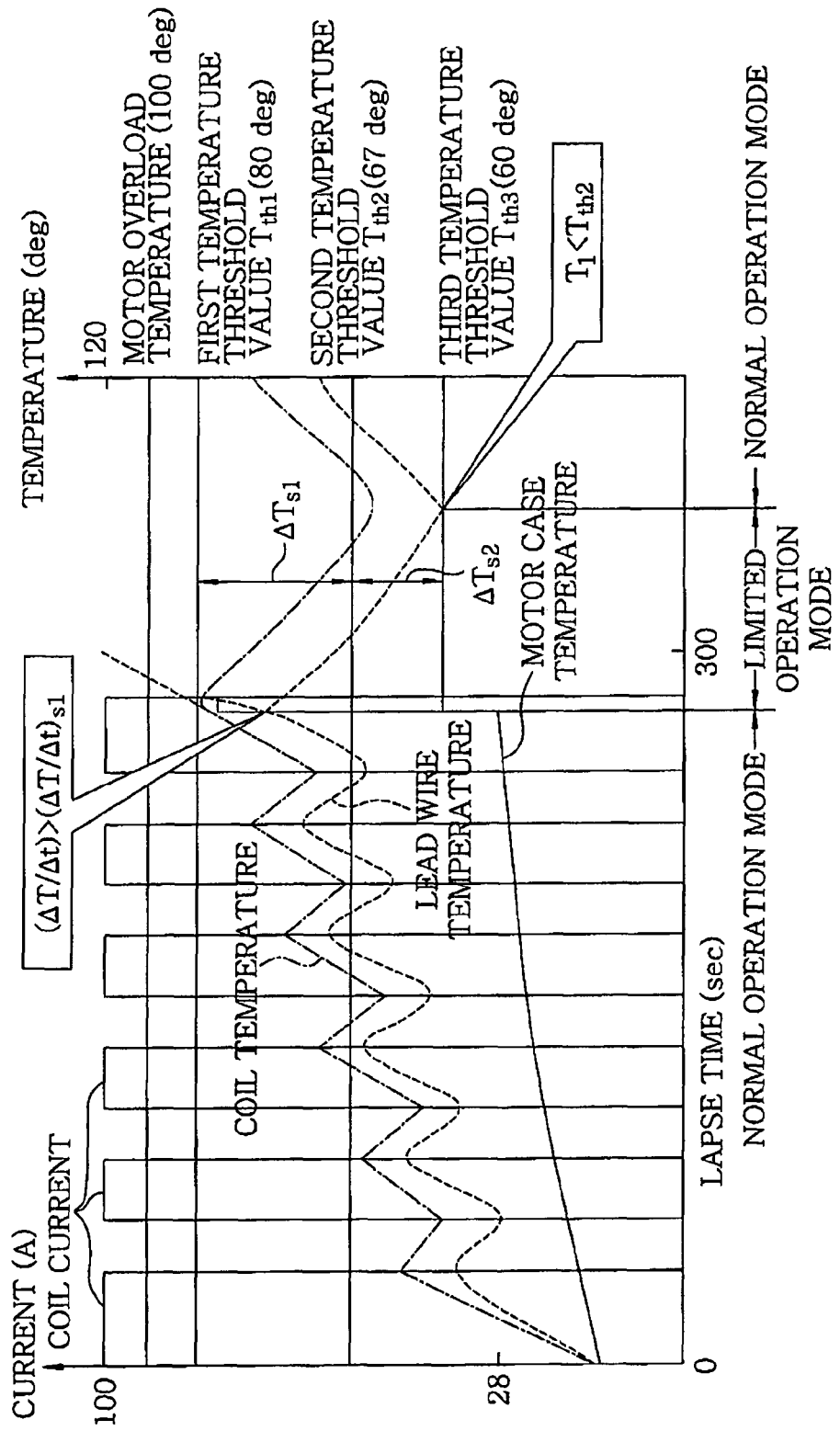
FIG. 3 is a graph representing the relationship between the lapse time and the current/temperature of the respective portions of the rechargeable electric power tool in accordance with a first embodiment of the present invention.

In this regard, the first temperature threshold value $T_{th1}$ (=80 deg) refers to a temperature threshold value available when the motor 4 comes into a locked state by the high current intermittently flowing through the motor 4 as illustrated in FIG. 3 but before the motor 4 falls into an overload state. This situation occurs in the event that a large torque is generated in the motor 4 and the trigger lever 5a is intermittently operated by a user, e.g., in such an instance where a series of bolts is successively driven into a hard object made of concrete, metal or the like. The first temperature threshold value $T_{th1}$ is set by the microcomputer 11 with respect to the temperature of the contact point portion 7a of the lead wire 7 and is stored in the memory of the microcomputer 11. As shown in FIG. 3, the motor 4 falls into an overload state when the temperature of coil reaches 100 deg. The microcomputer 11 detects the operation of the trigger lever 5a (or the changeover of the trigger switch 5) in response to the operation control signal inputted thereto.

The present inventors have found the following facts. In case where the motor 4 falls into an overload state by the high current intermittently flowing through the motor 4 as shown in FIG. 3, the first thermistor 9 arranged in the contact point portion 7a between the lead wire 7 and the switch block 8 shows higher capability to follow the temperature of the coil as a heat source than the capability exhibited by the second thermistor 9a arranged in the motor case 4a or the third thermistor 9b arranged in the battery pack 2. The reason for this appears to be as follows. As compared to the motor case 4a, the lead wire 7 or the annular terminal 9m of the contact point portion 7a is small in thermal capacity. Thus, the increase or decrease in the temperature of the lead wire 7 or the annular terminal 9m is easy to occur. If the temperature of the motor 4 is rapidly increased by the high current intermittently flowing through the motor 4 (or the coil thereof), the quantity of heat transferred to the contact point portion 7a is greater than the quantity of heat dissipated from the contact point portion 7a. As a consequence, the temperature rise takes precedence over the temperature drop. The first temperature threshold value $T_{th1}$ is set in view of the knowledge set forth above.

The second temperature threshold value $T_{th2}$ (=67 deg) is set lower than the first temperature threshold value $T_{th1}$ by the preset temperature difference $\Delta T_{s1}$ (13 deg in the present embodiment).

The third temperature threshold value $T_{th3}$ (=60 deg) is set lower than the second temperature threshold value $T_{th2}$ by the preset temperature difference $\Delta T_{s2}$ (7 deg in the present embodiment). The third temperature threshold value $T_{th3}$ is set to ensure that, even when the motor 4 falls into a locked state, the possibility of smoke generation or other trouble in the motor 4 can be completely eliminated insofar as the detected temperature $T_1$ is kept smaller than the third temperature threshold value $T_{th3}$.

Therefore, it is possible to prevent the motor 4 from falling into an overload state and to prevent the coil or the motor case from coming into a high temperature state and generating smoke, as long as the motor 4 is used in a state that the detected temperature $T_1$ of the contact point portion 7a is kept equal to or smaller than the first temperature threshold value $T_{th1}$. In this limited operation mode, the FET 10 may be turned off (or the duty ratio of the FET 10 may be made zero) to stop the operation of the motor 4, instead of limiting the revolution number of the motor 4 to a predetermined value or less.

Figure 4:
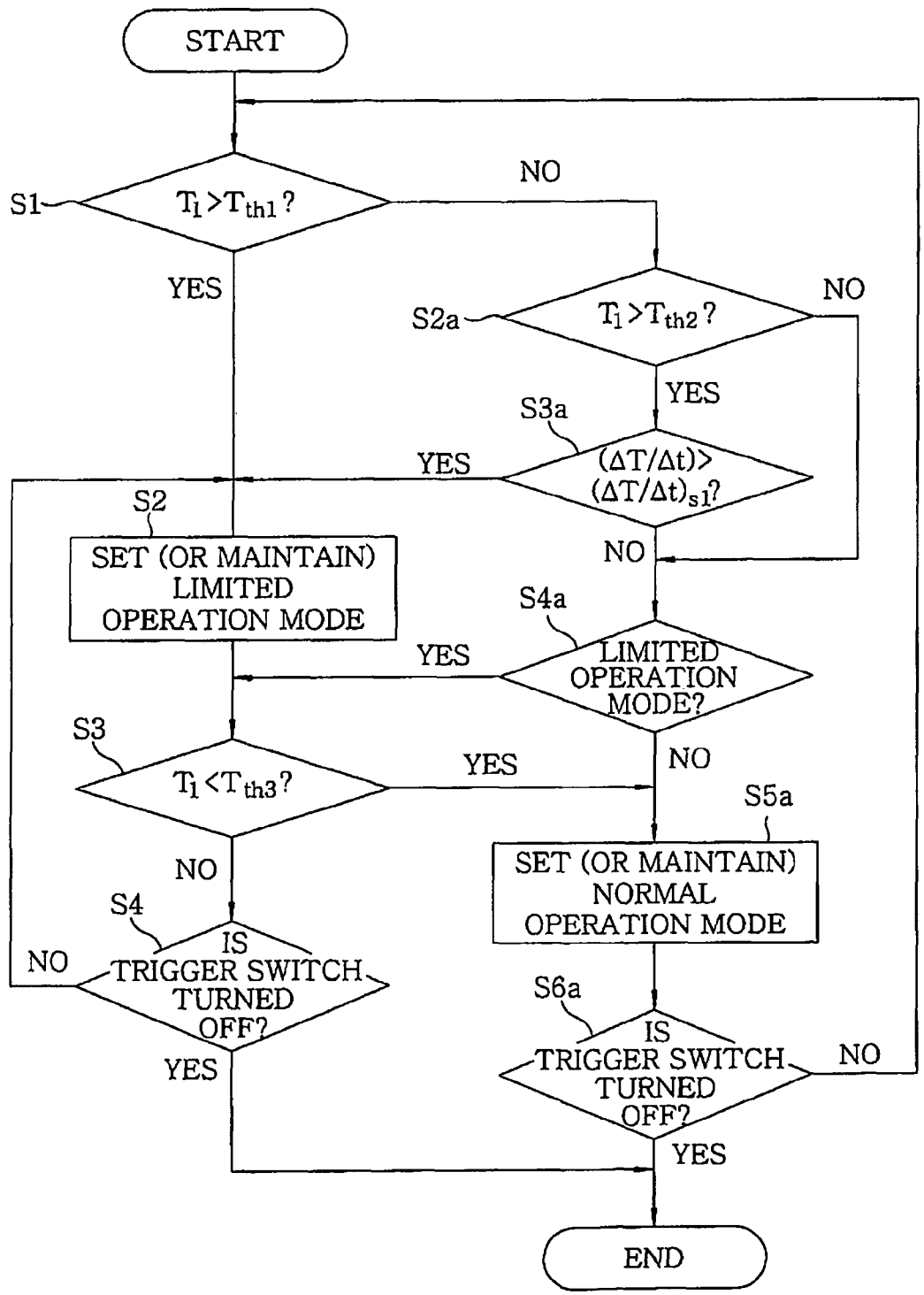
FIG. 4 is a flowchart illustrating the operation of a control system of the rechargeable electric power tool in accordance with the first embodiment of the present invention.

The operation of a control system of the rechargeable electric power tool of the present embodiment will now be described in detail with reference to FIG. 4.

If the trigger lever 5a is operated by a user to turn on the trigger switch 5, the lever operation detecting circuit inputs an operation control signal to the microcomputer 11 through the voltage regulator circuit 13.

Then, the microcomputer 11 is supplied with electric power to start its operation if in a power-off state and determines the magnitude relation between the detected temperature $T_1$ corresponding to the temperature detection signal outputted from the first thermistor 9 and the first temperature threshold value $T_{th1}$ (step S1). When the power tool is in an initial state just after its startup operation, the microcomputer 11 is set in the normal operation mode.

If the detected temperature $T_1$ is determined to be greater than the first temperature threshold value $T_{th1}$ in step S1 (namely, if YES in step S1), the microcomputer 11 decides that the motor 4 may fall into an overload state and the setting of the microcomputer 11 is changed from the normal operation mode to a limited operation mode (step S2) (see FIG. 3). Then, the LED display unit 15 is turned on by the microcomputer 11 to notify the user of such a situation. In case where the limited operation mode has already been set, the microcomputer 11 maintains the limited operation mode.

If the detected temperature $T_1$ is determined to be equal to or smaller than the first temperature threshold value $T_{th1}$ in step S1 (namely, if NO in step S1), the microcomputer 11 determines the magnitude relation between the detected temperature $T_1$ and the second temperature threshold value $T_{th2}$ (step S2a).

If the detected temperature $T_1$ is determined to be greater than the second temperature threshold value $T_{th2}$ in step S2a (namely, if YES in step S2a), the microcomputer 11 determines the magnitude relation between the calculated temperature increase rate ($\Delta T/\Delta t$) and the first preset temperature increase rate $(\Delta T/\Delta t)_{s1}$ (step S3a).

If the detected temperature $T_1$ is determined to be equal to or smaller than the second temperature threshold value $T_{th2}$ in step S2a (namely, if NO in step S2a), the flow proceeds to step S4a where it is determined whether the microcomputer 11 is in limited operation mode. If it is determined to be limited operation mode, the flow proceeds to step S3 where the microcomputer 11 determines the magnitude relation between the detected temperature $T_1$ (deg) and the third temperature threshold value $T_{th3}$ (deg) (step S3). If NO in step S4a, the microcomputer 11 maintains the normal operation mode (step 5a).

Meanwhile, if the calculated temperature increase rate ($\Delta T/\Delta t$) is determined to be greater than the first preset temperature increase rate $(\Delta T/\Delta t)_{s1}$ in step S3a (namely, if YES in step S3a), the flow proceeds to step S2 in which the setting of the microcomputer 11 is changed from the normal operation mode to the limited operation mode.

If the calculated temperature increase rate ($\Delta T/\Delta t$) is determined to be equal to or smaller than the first preset temperature increase rate $(\Delta T/\Delta t)_{s1}$ in step S3a (namely, if NO in step S3a), the flow proceeds to step S4a to determine whether the microcomputer 11 is in the limited operation mode. If NO in step S4a, the microcomputer 11 maintains the normal operation mode (step 5a).

While the microcomputer 11 is in the limited operation mode, the microcomputer 11 determines the magnitude relation between the detected temperature $T_1$ (deg) and the third temperature threshold value $T_{th3}$ (deg) (step S3).

As a result of heat dissipation from the coil of the motor 4, if the detected temperature $T_1$ is determined to be smaller than the third temperature threshold value $T_{th3}$ in step S3 (namely, if YES in step S3), the setting of the microcomputer 11 is changed (restored) from the limited operation mode to the normal operation mode (see FIG. 3) (step S5a). Then, the LED display unit 15 is turned off by the microcomputer 11 to notify the user of such a situation.

If the detected temperature $T_1$ is determined to be equal to or greater than the third temperature threshold value $T_{th3}$ in step S3 (namely, if NO in step S3), the microcomputer 11 determines whether the trigger switch 5 is turned off (step S4) and if NO in step S4, the microcomputer 11 maintains the limited operation mode (step S2).

Even if the trigger switch 5 is turned on again while the microcomputer 11 is in the limited operation mode as noted just above, the microcomputer 11 does not come back to the normal operation mode unless the detected temperature $T_1$ becomes smaller than the third temperature threshold value $T_{th3}$.

If the trigger switch 5 is on (step S6a) while the microcomputer 11 is in the normal operation mode, the determination of step S1 is performed again.

The rechargeable electric power tool of the present embodiment can offer the following advantageous effect.

In the normal operation mode and upon changeover of the trigger switch 5, if the detected temperature $T_1$ is determined to be greater than the first temperature threshold value $T_{th1}$ or if the calculated temperature increase rate ($\Delta T/\Delta t$) is determined to be greater than the first preset temperature increase rate $(\Delta T/\Delta t)_{s1}$ after the detected temperature $T_1$ has been determined to be greater than the second temperature threshold value $T_{th2}$ when it is not greater than $T_{th1}$, the microcomputer 11 decides that the motor 4 may fall into an overload state. Thus, the microcomputer 11 is set in the limited operation mode in which the revolution number of the motor 4 is limited to a predetermined value or less. Thanks to this feature, the revolution number of the motor 4 is limited to a predetermined value or less before the motor 4 actually falls into an overload state. This assists in preventing occurrence of trouble such as smoke generation or the like in the motor 4. In addition, the first thermistor 9 is arranged on the lead wire 7 through which to supply an electric current to the coil of the motor 4. This assures enhanced heat transfer from the coil as a heat source to the first thermistor 9 and makes it possible to detect the temperature of the coil with increased temperature-following capability. Therefore, the determination criteria for setting the microcomputer 11 in the limited operation mode include not only the determination that the detected temperature $T_1$ is greater than the first temperature threshold value $T_{th1}$ but also the magnitude relation between the calculated temperature increase rate ($\Delta T/\Delta t$) and the first preset temperature increase rate $(\Delta T/\Delta t)_{s1}$ after the detected temperature $T_1$ has been determined to be greater than the second temperature threshold value $T_{th2}$ when it is not greater than $T_{th1}$. As a consequence, the microcomputer 11 is set in the limited operation mode not only when the detected temperature $T_1$ exceeds the first temperature threshold value $T_{th1}$ but also when a sharp increase in the temperature of the coil (or the motor 4) is detected. This makes it possible to effectively prevent the motor 4 from falling into an overload state. The microcomputer 11 returns to the normal operation mode if the trigger lever 5a is operated and if the detected temperature $T_1$ is determined to be smaller than the third temperature threshold value $T_{th3}$. This eliminates the possibility of impairing the handling property of the rechargeable electric power tool.

Second Embodiment

The rechargeable electric power tool of the present embodiment is the same in configuration as the power tool of the first embodiment shown in FIGS. 1 and 2. Common parts will be designated by like reference characters and will be omitted from description.

With the rechargeable electric power tool of the present embodiment, a first temperature threshold value $T_{th1}$, a second temperature threshold value $T_{th2}$ lower than the first temperature threshold value $T_{th1}$ by a preset temperature difference $\Delta T_{s1}$, a first preset temperature increase rate $(\Delta T/\Delta t)_{s1}$ and a third temperature threshold value $T_{th3}$ lower than the second temperature threshold value $T_{th2}$ by a preset temperature difference $\Delta T_{s2}$ are set in the first thermistor 9 arranged on the lead wire 7. Furthermore, a first temperature threshold value $T_{tha}$, a second temperature threshold value $T_{thb}$ lower than the first temperature threshold value $T_{tha}$ by a preset temperature difference $\Delta T_{sa}$, a first preset temperature increase rate $(\Delta T/\Delta t)_{s2}$ and a third temperature threshold value $T_{thc}$ lower than the second temperature threshold value $T_{thb}$ by a preset temperature difference $\Delta T_{sb}$ are set in the second thermistor 9a arranged in the motor case 4a.

Based on the temperature detection signals outputted from the first thermistor 9 and the second thermistor 9a, the microcomputer 11 calculates first and second calculated temperature increase rates $(\Delta T/\Delta t)$ by dividing a temperature elevation degree $\Delta T$ by a lapse time $\Delta t$.

Upon changeover of the trigger switch 5, the microcomputer 11 determines the magnitude relation between the detected temperature $T_1$ corresponding to the temperature detection signal outputted from the first thermistor 9 and the first temperature threshold value $T_{th1}$ and the second temperature threshold value $T_{th2}$, the magnitude relation between the first calculated temperature increase rate $(\Delta T/\Delta t)$ and the first preset temperature increase rate $(\Delta T/\Delta t)_{s1}$, the magnitude relation between the detected temperature $T_2$ corresponding to the temperature detection signal outputted from the second thermistor 9a and the first temperature threshold value $T_{tha}$ and the second temperature threshold value $T_{thb}$, and the magnitude relation between the second calculated temperature increase rate $(\Delta T/\Delta t)$ and the first preset temperature increase rate $(\Delta T/\Delta t)_{s2}$.

If the detected temperature $T_1$ is determined to be greater than the first temperature threshold value $T_{th1}$ or the detected temperature $T_2$ is determined to be greater than the first temperature threshold value $T_{tha}$, or if the first calculated temperature increase rate $(\Delta T/\Delta t)$ is determined to be greater than the first preset temperature increase rate $(\Delta T/\Delta t)_{s1}$ after the detected temperature $T_1$ has been determined to be greater than the second temperature threshold value $T_{th2}$ when it is not greater than $T_{th1}$ or the second calculated temperature increase rate $(\Delta T/\Delta t)$ is determined to be greater than the first preset temperature increase rate $(\Delta T/\Delta t)_{s2}$ after the detected temperature $T_2$ has been determined to be greater than the second temperature threshold value $T_{thb}$ when it is not greater than $T_{tha}$, the microcomputer 11 decides that the motor 4 may fall into an overload state and sets itself in the limited operation mode mentioned earlier.

In the present embodiment, it is preferred that the first preset temperature increase rate $(\Delta T/\Delta t)_{s1}$ is set equal to or greater than 2 degrees/sec but smaller than 4 degrees/sec. It is also preferred that the first preset temperature increase rate $(\Delta T/\Delta t)_{s2}$ is set equal to or greater than 4 degrees/sec but smaller than 6 degrees/sec.

In the limited operation mode and upon changeover of the trigger switch 5, the microcomputer 11 determines the magnitude relation between the detected temperature $T_1$ and the third temperature threshold value $T_{th3}$, and the magnitude relation between the detected temperature $T_2$ and the third temperature threshold value $T_{thc}$.

If the detected temperature $T_1$ is determined to be equal to or smaller than the third temperature threshold value $T_{th3}$ and if the detected temperature $T_2$ is determined to be equal to or smaller than the third temperature threshold value $T_{thc}$, the microcomputer 11 releases the limited operation mode and returns to the normal operation mode.

Figure 5:
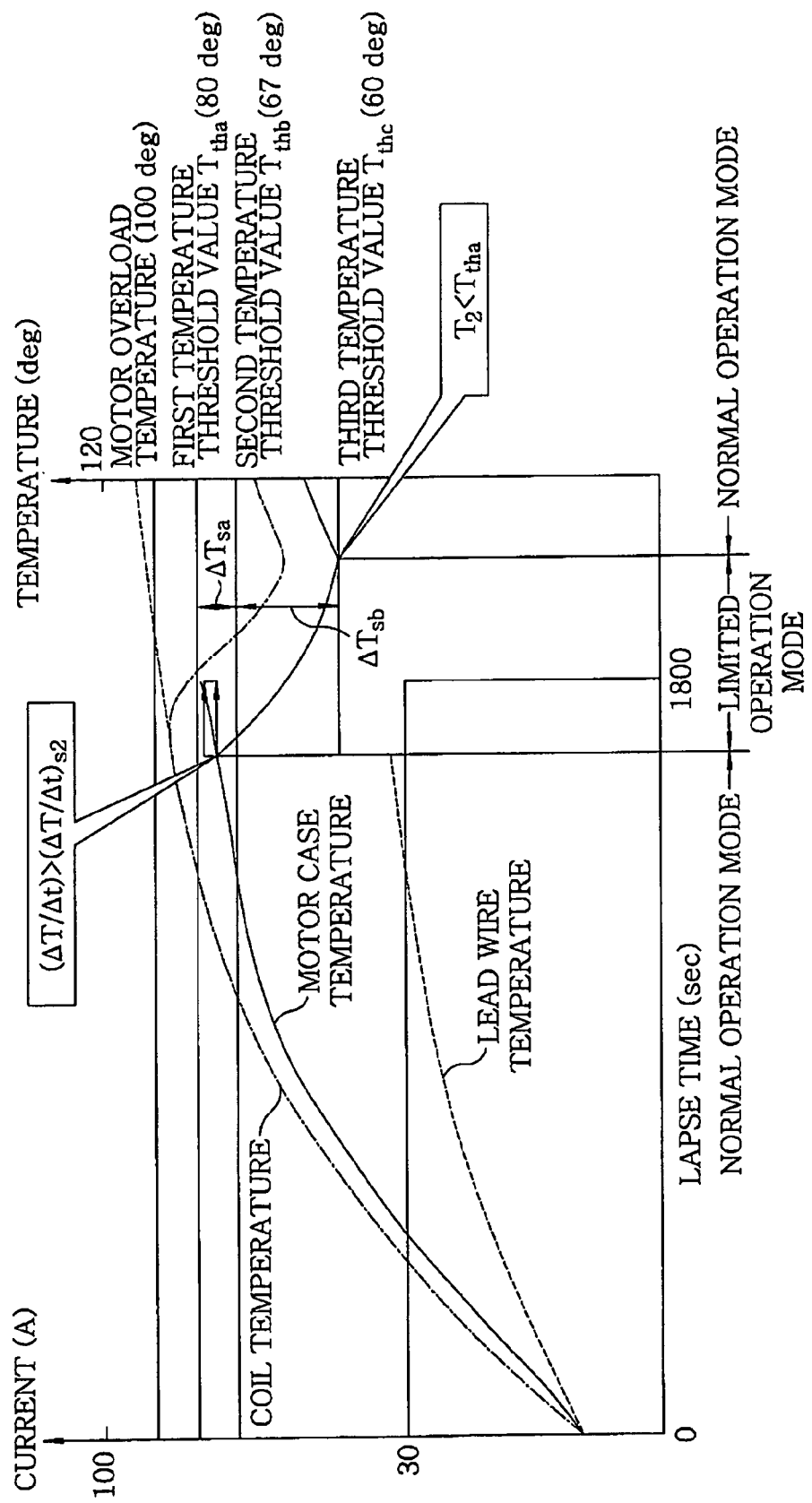
FIG. 5 is a graph representing the relationship between the lapse time and the current/temperature of the respective portions of the rechargeable electric power tool in accordance with a second embodiment of the present invention.

In this regard, the first temperature threshold value $T_{tha}$ (=90 deg) refers to a temperature threshold value available when the motor 4 is continuously supplied with a low current for a prolonged period of time (e.g., about 30 minutes) as illustrated in FIG. 5 but before the motor 4 falls into an overload state. This situation occurs in the event that a relatively small torque is generated in the motor 4 and the trigger lever 5a is intermittently operated by a user, e.g., in such an instance where a series of bolts is successively driven into a soft object made of wood, plastic or the like. The first temperature threshold value $T_{tha}$ is set by the microcomputer 11 with respect to the motor case 4a and is stored in the memory of the microcomputer 11. As shown in FIG. 5, the motor 4 falls into an overload state when the temperature of coil reaches 100 deg. The microcomputer 11 detects the operation of the trigger lever 5a (or the changeover of the trigger switch 5) in response to the operation control signal inputted thereto.

The present inventors have found the following facts. In case where the motor 4 is continuously supplied with a low current for a prolonged period of time as shown in FIG. 5, the second thermistor 9a arranged in the motor case 4a shows higher capability to follow the temperature of the coil as a heat source than the capability exhibited by the first thermistor 9 arranged in the contact point portion 7a of the lead wire 7 and the switch block 8 or the third thermistor 9b arranged in the battery pack 2. The reason for this appears to be as follows. As compared to the lead wire 7 or the annular terminal 9m of the contact point portion 7a, the motor case 4a is large in thermal capacity. Thus, the increase or decrease in the temperature of the motor case 4a is difficult to occur. In case where the motor 4 (or the coil) is continuously supplied with a low current for a prolonged period of time and the temperature thereof is increased gently, heat is slowly transferred to and accumulated in the motor case 4a. As a consequence, the temperature of the motor case 4a is definitely increased little by little. In view of the knowledge set forth above, the first temperature threshold value $T_{tha}$ is set with respect to the motor case 4a.

The second temperature threshold value $T_{thb}$ (=80 deg) is set lower than the first temperature threshold value $T_{tha}$ by the preset temperature difference $\Delta T_{sa}$ (10 deg in the present embodiment).

The third temperature threshold value $T_{thc}$ (=60 deg) is set lower than the second temperature threshold value $T_{thb}$ by the preset temperature difference $\Delta T_{sb}$ (20 deg in the present embodiment). The third temperature threshold value $T_{thb}$ is set to ensure that the possibility of smoke generation or other trouble in the motor 4 can be completely eliminated insofar as the detected temperature $T_2$ is kept smaller than the third temperature threshold value $T_{thc}$.

During the continuous use of the motor 4 at a low current as set forth above, therefore, it is possible to prevent the motor 4 from falling into an overload state and to prevent the coil or the motor case from coming into a high temperature state and generating smoke, as long as the motor 4 is used in a state that the detected temperature $T_2$ of the motor case 4a is kept equal to or smaller than the first temperature threshold value $T_{tha}$. In this limited operation mode, the FET 10 may be turned off to stop the operation of the motor 4, instead of limiting the revolution number of the motor 4 to a predetermined value or less.

The operation of a control system of the rechargeable electric power tool of the present embodiment will now be described in detail with reference to FIG. 6.

Figure 6:
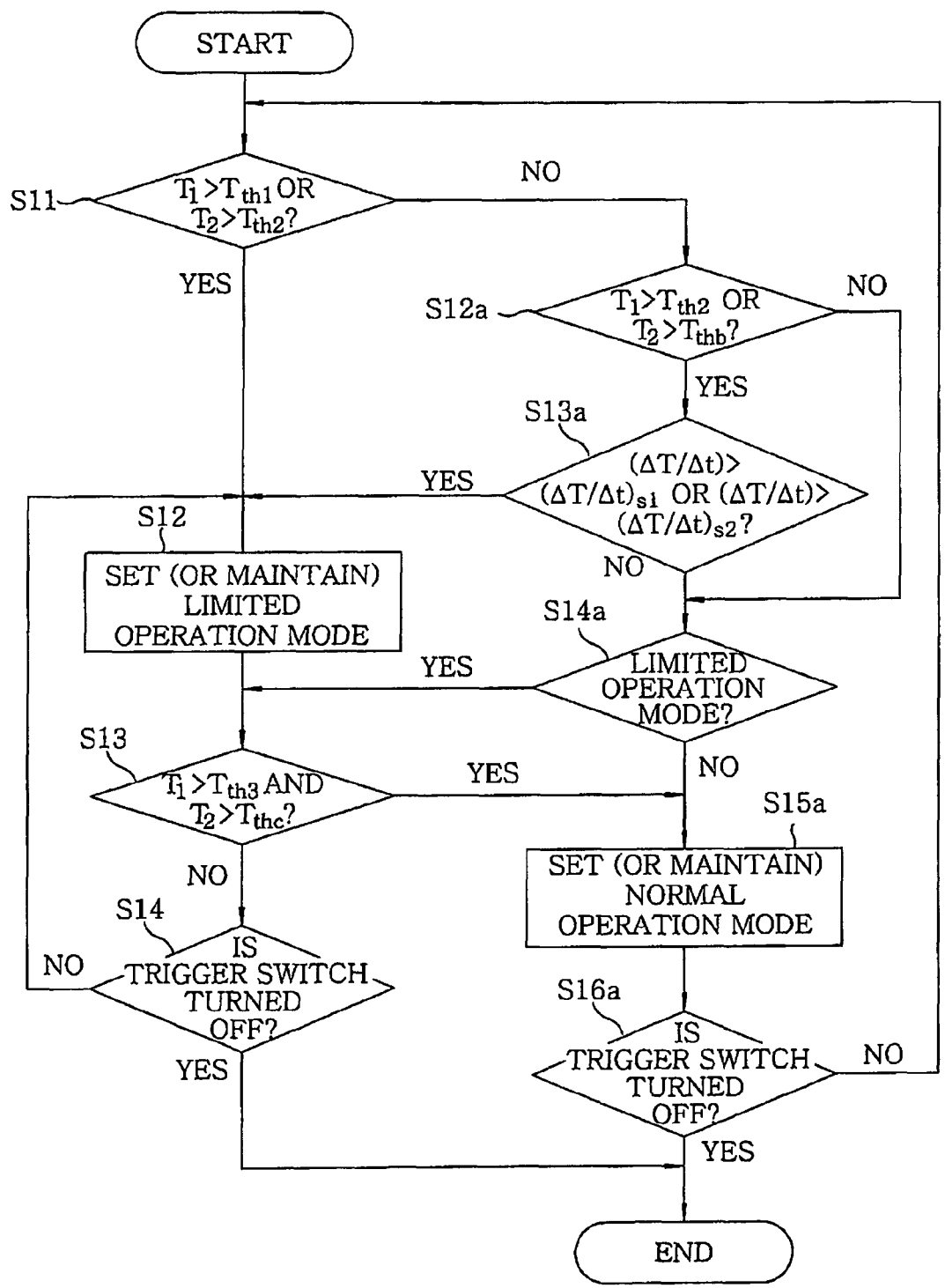
FIG. 6 is a flowchart illustrating the operation of a control system of the rechargeable electric power tool in accordance with the second embodiment of the present invention.

If the trigger lever 5a is operated by a user to turn on the trigger switch 5 as shown in FIG. 6, the lever operation detecting circuit inputs an operation control signal to the microcomputer 11 through the voltage regulator circuit 13.

Then, the microcomputer 11 is supplied with electric power to start its operation if in a power-off state and respectively determines the magnitude relation between the detected temperature $T_1$ corresponding to the temperature detection signal outputted from the first thermistor 9 and the first temperature threshold value $T_{th1}$ and the magnitude relation between the detected temperature $T_2$ corresponding to the temperature detection signal outputted from the second thermistor 9a and the first temperature threshold value $T_{tha}$ (step S11). When the power tool is in an initial state just after its startup operation, the microcomputer 11 is set in the normal operation mode.

If the detected temperature $T_1$ is determined to be greater than the first temperature threshold value $T_{th1}$ or if the detected temperature $T_2$ is determined to be greater than the first temperature threshold value $T_{tha}$ in step S11 (namely, if YES in step S11), the microcomputer 11 decides that the motor 4 may fall into an overload state and the setting of the microcomputer 11 is changed from the normal operation mode to the limited operation mode (step S12) (see FIG. 5). Then, the LED display unit 15 is turned on by the microcomputer 11 to notify the user of such a situation. In case where the limited operation mode has already been set, the microcomputer 11 maintains the limited operation mode.

If the detected temperature $T_1$ is determined to be equal to or smaller than the first temperature threshold value $T_{th1}$ or if the detected temperature $T_2$ is determined to be equal to or smaller than the first temperature threshold value $T_{tha}$ in step S11 (namely, if NO in step S11), the microcomputer 11 respectively determines the magnitude relation between the detected temperature $T_1$ and the second temperature threshold value $T_{th2}$ and the magnitude relation between the detected temperature $T_2$ and the second temperature threshold value $T_{thb}$ (step S12a).

If the detected temperature $T_1$ is determined to be greater than the second temperature threshold value $T_{th2}$ or if the detected temperature $T_2$ is determined to be greater than the second temperature threshold value $T_{thb}$ in step S12a (namely, if YES in step S12a), the microcomputer 11 determines the magnitude relation between the first calculated temperature increase rate $(\Delta T/\Delta t)$ and the first preset temperature increase rate $(\Delta T/\Delta t)_{s1}$ and the magnitude relation between the second calculated temperature increase rate $(\Delta T/\Delta t)$ and the first preset temperature increase rate $(\Delta T/\Delta t)_{s2}$ (step S13a).

If the detected temperature $T_1$ is determined to be equal to or smaller than the second temperature threshold value $T_{th2}$ or if the detected temperature $T_2$ is determined to be equal to or smaller than the second temperature threshold value $T_{thb}$ in step S12a (namely, if NO in step S12a), the flow proceeds to step S14a where it is determined whether the microcomputer 11 is in limited operation mode. If it is determined to be limited operation mode, the flow proceeds to step S13 where the microcomputer 11 determines the magnitude relation between the detected temperature $T_1$ (deg) and the third temperature threshold value $T_{th3}$ (deg) and the magnitude relation between the detected temperature $T_2$ (deg) and the third temperature threshold value $T_{thc}$ (deg) (step S13). If NO in step S14a, the microcomputer 11 maintains the normal operation mode (step 15a).

Meanwhile, if the first calculated temperature increase rate $(\Delta T/\Delta t)$ is determined to be greater than the first preset temperature increase rate $(\Delta T/\Delta t)_{s1}$ or if the second calculated temperature increase rate $(\Delta T/\Delta t)$ is determined to be greater than the first preset temperature increase rate $(\Delta T/\Delta t)_{s2}$ in step S13a (namely, if YES in step S13a), the flow proceeds to step S12 in which the setting of the microcomputer 11 is changed from the normal operation mode to the limited operation mode.

If the first calculated temperature increase rate $(\Delta T/\Delta t)$ is determined to be equal to or smaller than the first preset temperature increase rate $(\Delta T/\Delta t)_{s1}$ or if the second calculated temperature increase rate $(\Delta T/\Delta t)$ is determined to be equal to or smaller than the first preset temperature increase rate $(\Delta T/\Delta t)_{s2}$ in step S13a (namely, if NO in step S13a), the flow proceeds to step S14a to determine whether the microcomputer 11 is in the limited operation mode. If NO in step S14a, the microcomputer 11 maintains the normal operation mode (step 15a).

While the microcomputer 11 is in the limited operation mode, the microcomputer 11 respectively determines the magnitude relation between the detected temperature $T_1$ (deg) and the third temperature threshold value $T_{th3}$ (deg) and the magnitude relation between the detected temperature $T_2$ (deg) and the third temperature threshold value $T_{thc}$ (deg) (step S13).

As a result of heat dissipation from the coil of the motor 4, if the detected temperature $T_1$ is determined to be smaller than the third temperature threshold value $T_{th3}$ and if the detected temperature $T_2$ is determined to be smaller than the third temperature threshold value $T_{thc}$ in step S13 (namely, if YES in step S13), the setting of the microcomputer 11 is changed (restored) from the limited operation mode to the normal operation mode (step S15a) (see FIG. 5). Then, the LED display unit 15 is turned off by the microcomputer 11 to notify the user of such a situation.

If the detected temperature $T_1$ is determined to be equal to or greater than the third temperature threshold value $T_{th3}$ in step S13 and if the detected temperature $T_2$ is determined to be equal to or greater than the third temperature threshold value $T_{thc}$ in step S13 (namely, if NO in step S13), the microcomputer 11 determines whether the trigger switch 5 is turned off (step S14) and if NO in step S14, the microcomputer 11 maintains the limited operation mode (step S12).

Even if the trigger switch 5 is turned on again while the microcomputer 11 is in the limited operation mode as noted just above, the microcomputer 11 does not come back to the normal operation mode unless the detected temperature $T_1$ becomes smaller than the third temperature threshold value $T_{th3}$ and the detected temperature $T_2$ becomes smaller than the third temperature threshold value $T_{thc}$.

If the trigger switch 5 is on (step S16a) while the microcomputer 11 is in the normal operation mode, the determination of step S11 is performed again.

The rechargeable electric power tool of the present embodiment can offer the following advantageous effect.

Upon changeover of the trigger switch 5, if the detected temperature $T_1$ is determined to be greater than the first temperature threshold value $T_{th1}$ or the detected temperature $T_2$ is determined to be greater than the first temperature threshold value $T_{tha}$, or if the first calculated temperature increase rate ($\Delta T/\Delta t$) is determined to be greater than the first preset temperature increase rate $(\Delta T/\Delta t)_{s1}$ after the detected temperature $T_1$ has been determined to be greater than the second temperature threshold value $T_{th2}$ when it is not greater than $T_{th1}$ or the second calculated temperature increase rate ($\Delta T/\Delta t$) is determined to be greater than the first preset temperature increase rate $(\Delta T/\Delta t)_{s2}$ after the detected temperature $T_2$ has been determined to be greater than the second temperature threshold value $T_{thb}$ when it is not greater than $T_{tha}$, the microcomputer 11 decides that the motor 4 may fall into an overload state. Thus, the microcomputer 11 is set in the limited operation mode in which the revolution number of the motor 4 is limited to a predetermined value or less. Thanks to this feature, the revolution number of the motor 4 is limited to a predetermined value or less before the motor 4 actually falls into an overload state. This assists in preventing occurrence of trouble such as smoke generation or the like in the motor 4. Therefore, the determination criteria for setting the microcomputer 11 in the limited operation mode include not only the determination that the detected temperature $T_1$ is greater than the first temperature threshold value $T_{th1}$ and the determination that the detected temperature $T_2$ is greater than the first temperature threshold value $T_{tha}$ but also the magnitude relation between the first calculated temperature increase rate ($\Delta T/\Delta t$) and the first preset temperature increase rate $(\Delta T/\Delta t)_{s1}$ after the detected temperature $T_1$ has been determined to be greater than the second temperature threshold value $T_{th2}$ when it is not greater than $T_{th1}$ and the magnitude relation between the second calculated temperature increase rate ($\Delta T/\Delta t$) and the first preset temperature increase rate $(\Delta T/\Delta t)_{s2}$ after the detected temperature $T_2$ has been determined to be greater than the second temperature threshold value $T_{thb}$ when it is not greater than $T_{tha}$. During the different use of the rechargeable electric power tool such as the use of the motor 4 in a locked state or the continuous use of the motor 4 at a low current, therefore, the microcomputer 11 is set in the limited operation mode not only when the detected temperature $T_1$ exceeds the first temperature threshold value $T_{th1}$ or the detected temperature $T_2$ exceeds the first temperature threshold value $T_{tha}$ but also when a sharp increase in the temperature of the coil (or the motor 4) is detected in the temperature range equal to or higher than the second temperature threshold value $T_{th2}$ or $T_{thb}$. This makes it possible to effectively prevent the motor 4 from falling into an overload state. The microcomputer 11 returns to the normal operation mode if the trigger lever 5a is operated and if the detected temperature $T_1$ is determined to be equal to or smaller than the third temperature threshold value $T_{th3}$ or the detected temperature $T_2$ is determined to be equal to or smaller than the third temperature threshold value $T_{thc}$. This eliminates the possibility of impairing the handling property of the rechargeable electric power tool.

Third Embodiment

The rechargeable electric power tool of the present embodiment is the same in configuration as the power tool of the first embodiment shown in FIGS. 1 and 2. Common parts will be designated by like reference characters and will be omitted from description.

With the rechargeable electric power tool of the present embodiment, a first temperature threshold value $T_{th1}$, a second temperature threshold value $T_{th2}$ lower than the first temperature threshold value $T_{th1}$ by a preset temperature difference $\Delta T_{s1}$, a first preset temperature increase rate $(\Delta T/\Delta t)_{s1}$ and a third temperature threshold value $T_{th3}$ lower than the second temperature threshold value $T_{th2}$ by a preset temperature difference $\Delta T_{s2}$ are set in the first thermistor 9 arranged on the lead wire 7. Furthermore, a first temperature threshold value $T_{tha}$, a second temperature threshold value $T_{thb}$ lower than the first temperature threshold value $T_{tha}$ by a preset temperature difference $\Delta T_{sa}$, a first preset temperature increase rate $(\Delta T/\Delta t)_{s2}$ and a third temperature threshold value $T_{thc}$ lower than the second temperature threshold value $T_{thb}$ by a preset temperature difference $\Delta T_{sb}$ are set in the second thermistor 9a arranged in the motor case 4a. In addition, fourth temperature threshold values $T_{th4}$ and $T_{thd}$ respectively higher than the second temperature threshold values $T_{th2}$ and $T_{thb}$ but lower than the first temperature threshold values $T_{th1}$ and $T_{tha}$ and second preset temperature increase rates $(\Delta T/\Delta t)_{s11}$ and $(\Delta T/\Delta t)_{s12}$ respectively smaller than the first preset temperature increase rates $(\Delta T/\Delta t)_{s1}$ and $(\Delta T/\Delta t)_{s2}$ are set in the first thermistor 9 and the second thermistor 9a.

Upon changeover of the trigger switch 5, the microcomputer 11 determines the magnitude relation between the detected temperatures $T_1$ and $T_2$ corresponding to the temperature detection signals outputted from the first thermistor 9 and the second thermistor 9a and the fourth temperature threshold values $T_{th4}$ and $T_{thd}$, and the magnitude relation between the calculated temperature increase rate ($\Delta T/\Delta t$) and the second preset temperature increase rates $(\Delta T/\Delta t)_{s11}$ and $(\Delta T/\Delta t)_{s12}$.

If the first calculated temperature increase rate ($\Delta T/\Delta t$) is determined to be greater than the second preset temperature increase rate $(\Delta T/\Delta t)_{s11}$ after the detected temperature $T_1$ has been determined to be greater than the fourth temperature threshold value $T_{th4}$ or if the second calculated temperature increase rate ($\Delta T/\Delta t$) is determined to be greater than the second preset temperature increase rate $(\Delta T/\Delta t)_{s12}$ after the detected temperature $T_2$ has been determined to be greater than the fourth temperature threshold value $T_{thd}$, the microcomputer 11 decides that the motor 4 may fall into an overload state and sets itself in the limited operation mode mentioned earlier.

In the present embodiment, the second preset temperature increase rate $(\Delta T/\Delta t)_{s11}$ is preferably set equal to or greater than 1 degrees/sec but smaller than 2 degrees/sec so that the second preset temperature increase rate $(\Delta T/\Delta t)_{s11}$ can become smaller than the first preset temperature increase rate $(\Delta T/\Delta t)_{s1}$. Furthermore, the second preset temperature increase rate $(\Delta T/\Delta t)_{s12}$ is preferably set equal to or greater than 2 degrees/sec but smaller than 4 degrees/sec so that the second preset temperature increase rate $(\Delta T/\Delta t)_{s12}$ can become smaller than the first preset temperature increase rate $(\Delta T/\Delta t)_{s2}$.

In the limited operation mode and upon changeover of the trigger switch 5, the microcomputer 11 determines the magnitude relation between the detected temperature $T_1$ and the third temperature threshold value $T_{th3}$, and the magnitude relation between the detected temperature $T_2$ and the third temperature threshold value $T_{thd}$.

If the detected temperature $T_1$ is determined to be equal to or smaller than the third temperature threshold value $T_{th3}$ and if the detected temperature $T_2$ is determined to be equal to or smaller than the third temperature threshold value $T_{thc}$, the microcomputer 11 releases the limited operation mode and returns to the normal operation mode.

In this regard, the fourth temperature threshold value $T_{th4}$ (=75 deg) is set lower than the first temperature threshold value $T_{th1}$ by a preset temperature difference $\Delta T_{s3}$ (5 deg in the present embodiment). Furthermore, the fourth temperature threshold value $T_{thd}$ (=85 deg) is set lower than the first temperature threshold value $T_{tha}$ by a preset temperature difference $\Delta T_{sc}$ (5 deg in the present embodiment).

The operation of a control system of the rechargeable electric power tool of the present embodiment will now be described in detail with reference to FIG. 8.

Figure 8:
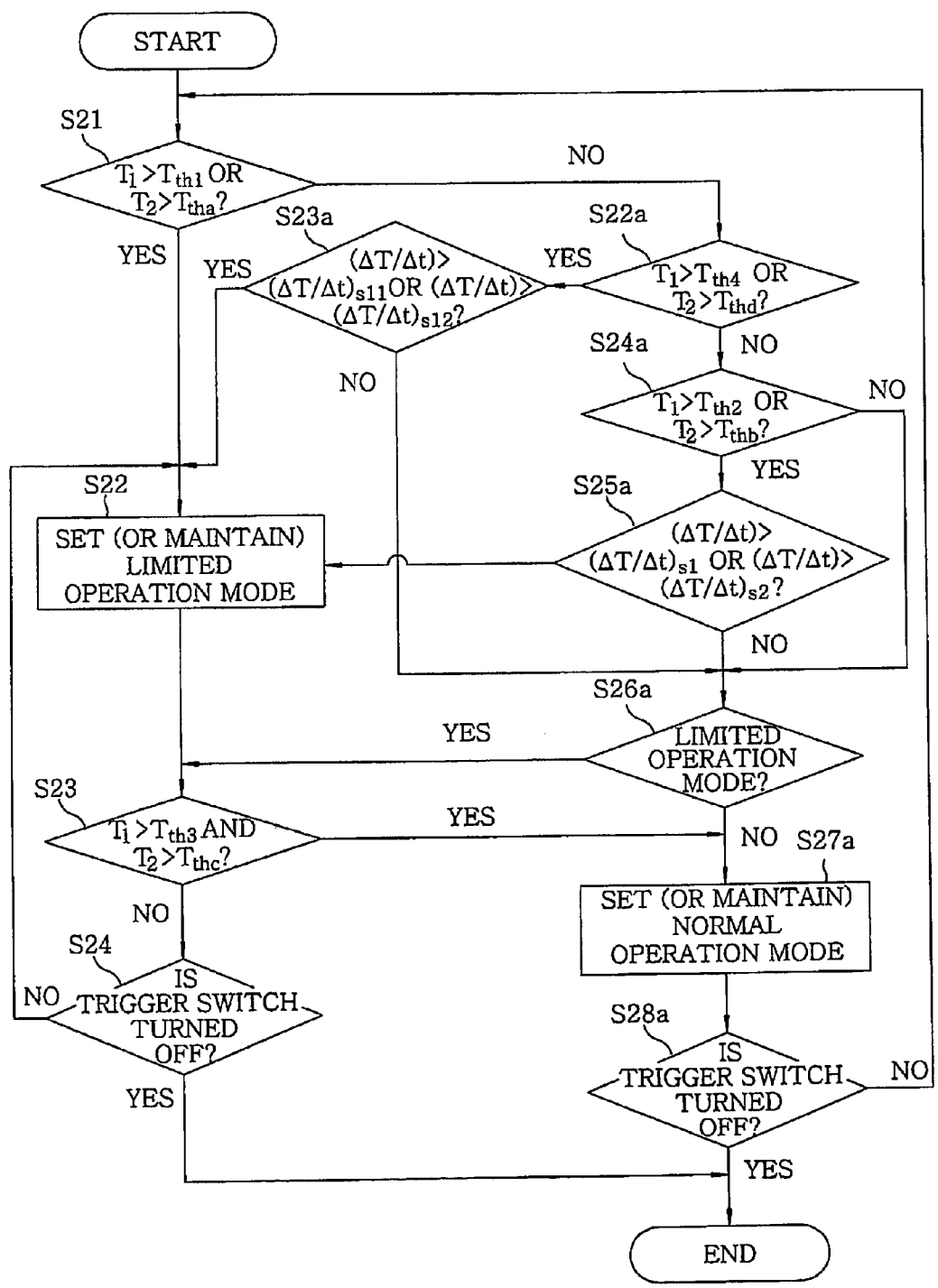
FIG. 8 is a flowchart illustrating the operation of a control system of the rechargeable electric power tool in accordance with the third embodiment of the present invention.

If the trigger lever 5a is operated by a user to turn on the trigger switch 5 as shown in FIG. 8, the lever operation detection circuit inputs an operation control signal to the microcomputer 11 through the voltage regulator circuit 13.

Then, the microcomputer 11 is supplied with electric power to start its operation if in a power-off state and determines the magnitude relation between the detected temperature $T_1$ corresponding to the temperature detection signal outputted from the first thermistor 9 and the first temperature threshold value $T_{th1}$ and the magnitude relation between the detected temperature $T_2$ corresponding to the temperature detection signal outputted from the second thermistor 9a and the first temperature threshold value $T_{tha}$ (step S21). When the power tool is in an initial state just after its startup operation, the microcomputer 11 is set in the normal operation mode.

Figure 7:
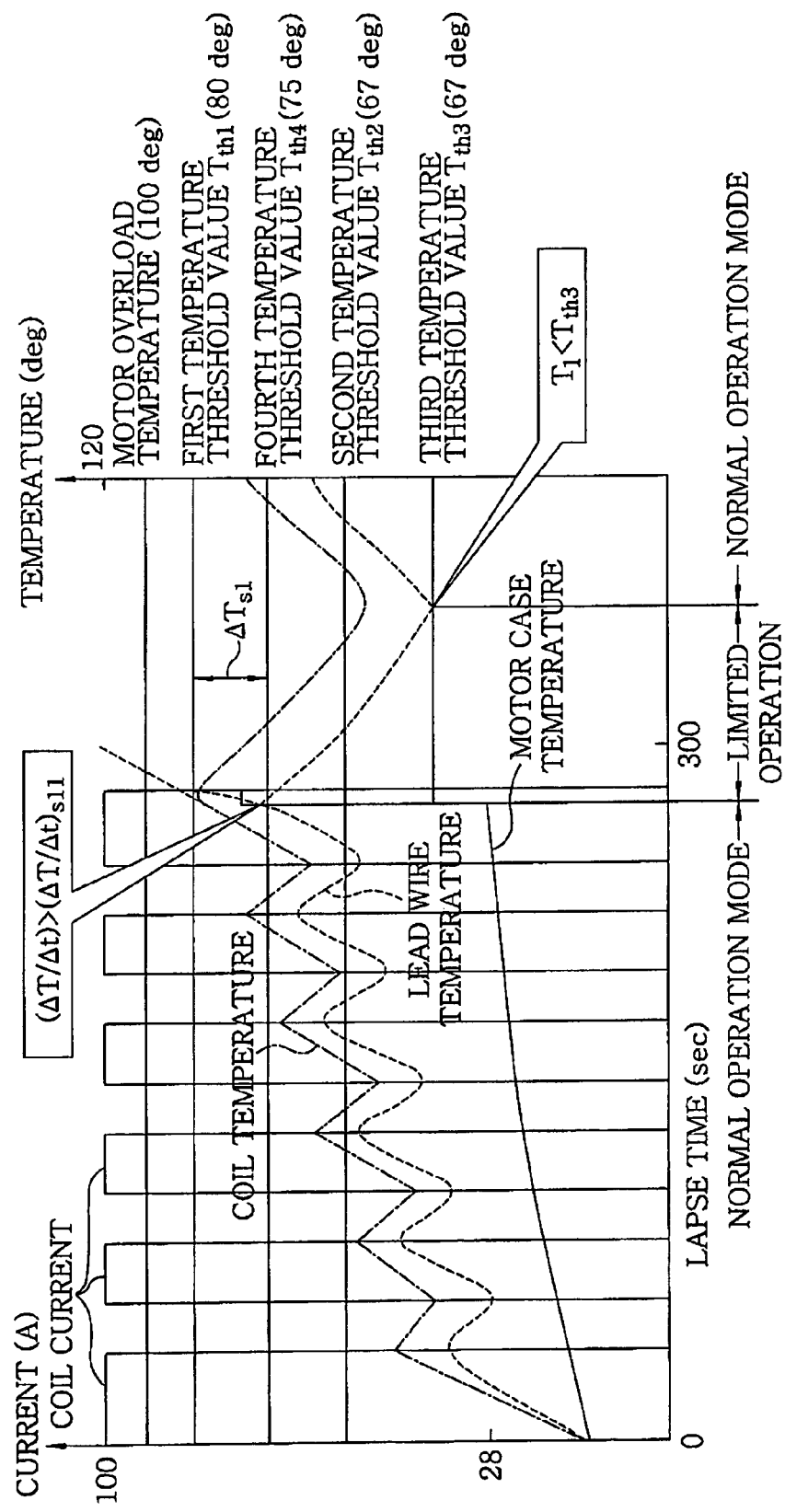
FIG. 7 is a graph representing the relationship between the lapse time and the current/temperature of the respective portions of the rechargeable electric power tool in accordance with a third embodiment of the present invention.

If the detected temperature $T_1$ is determined to be greater than the first temperature threshold value $T_{th1}$ or if the detected temperature $T_2$ is determined to be greater than the first temperature threshold value $T_{tha}$ in step S21 (namely, if YES in step S21), the microcomputer 11 decides that the motor 4 may fall into an overload state and the setting of the microcomputer 11 is changed from the normal operation mode to the limited operation mode (step S22) (see FIG. 7). Then, the LED display unit 15 is turned on by the microcomputer 11 to notify the user of such a situation. In case where the limited operation mode has already been set, the microcomputer 11 maintains the limited operation mode.

If the detected temperature $T_1$ is determined to be equal to or smaller than the first temperature threshold value $T_{th1}$ or if the detected temperature $T_2$ is determined to be equal to or smaller than the first temperature threshold value $T_{tha}$ in step S21 (namely, if NO in step S21), the microcomputer 11 determines the magnitude relation between the detected temperature $T_1$ and the fourth temperature threshold value $T_{th4}$ and the magnitude relation between the detected temperature $T_2$ and the fourth temperature threshold value $T_{thd}$ (step S22a).

If the detected temperature $T_1$ is determined to be greater than the fourth temperature threshold value $T_{th4}$ or if the detected temperature $T_2$ is determined to be greater than the fourth temperature threshold value $T_{thd}$ in step S22a (namely, if YES in step S22a), the microcomputer 11 determines the magnitude relation between the first calculated temperature increase rate ($\Delta T/\Delta t$) and the second preset temperature increase rate $(\Delta T/\Delta t)_{s11}$ and the magnitude relation between the second calculated temperature increase rate ($\Delta T/\Delta t$) and the second preset temperature increase rate $(\Delta T/\Delta t)_{s12}$ (step S23a).

If the detected temperature $T_1$ is determined to be equal to or smaller than the fourth temperature threshold value $T_{th4}$ or if the detected temperature $T_2$ is determined to be equal to or smaller than the fourth temperature threshold value $T_{thd}$ in step S22a (namely, if NO in step S22a), the microcomputer 11 determines the magnitude relation between the detected temperature $T_1$ and the second temperature threshold value $T_{th2}$ and the magnitude relation between the detected temperature $T_2$ and the second temperature threshold value $T_{thb}$ (step S24a).

If the detected temperature $T_1$ is determined to be greater than the second temperature threshold value $T_{th2}$ or if the detected temperature $T_2$ is determined to be greater than the second temperature threshold value $T_{thb}$ in step S24a (namely, if YES in step S24a), the microcomputer 11 determines the magnitude relation between the first calculated temperature increase rate ($\Delta T/\Delta t$) and the first preset temperature increase rate $(\Delta T/\Delta t)_{s1}$ and the magnitude relation between the second calculated temperature increase rate ($\Delta T/\Delta t$) and the first preset temperature increase rate $(\Delta T/\Delta t)_{s2}$ (step S25a).

If the detected temperature $T_1$ is determined to be equal to or smaller than the second temperature threshold value $T_{th2}$ or if the detected temperature $T_2$ is determined to be equal to or smaller than the second temperature threshold value $T_{thb}$ in step S24a (namely, if NO in step S24a), the flow proceeds to step S26a where it is determined whether the microcomputer 11 is in limited operation mode. If it is determined to be limited operation mode, the flow proceeds to step S23 where the microcomputer 11 determines the magnitude relation between the detected temperature $T_1$ (deg) and the third temperature threshold value $T_{th3}$ (deg) and the magnitude relation between the detected temperature $T_2$ (deg) and the third temperature threshold value $T_{thc}$ (deg) (step S23). If NO in step S26a, the microcomputer 11 maintains the normal operation mode (step 27a).

Meanwhile, if the first calculated temperature increase rate ($\Delta T/\Delta t$) is determined to be greater than the first preset temperature increase rate $(\Delta T/\Delta t)_{s1}$ or if the second calculated temperature increase rate ($\Delta T/\Delta t$) is determined to be greater than the first preset temperature increase rate $(\Delta T/\Delta t)_{s2}$ in step S25a (namely, if YES in step S25a), the flow proceeds to step S22 in which the setting of the microcomputer 11 is changed from the normal operation mode to the limited operation mode, thereby performing the operation set forth above.

If the first calculated temperature increase rate ($\Delta T/\Delta t$) is determined to be equal to or smaller than the first preset temperature increase rate $(\Delta T/\Delta t)_{s1}$ or if the second calculated temperature increase rate ($\Delta T/\Delta t$) is determined to be equal to or smaller than the first preset temperature increase rate $(\Delta T/\Delta t)_{s2}$ in step S25a (namely, if NO in step S25a), the flow proceeds to step S26a to determine whether the microcomputer 11 is in the limited operation mode. If NO in step S26a, the microcomputer 11 maintains the normal operation mode (step 27a).

While the microcomputer 11 is in the limited operation mode, the microcomputer 11 determines the magnitude relation between the detected temperature $T_1$ (deg) and the third temperature threshold value $T_{th3}$ (deg) and the magnitude relation between the detected temperature $T_2$ (deg) and the third temperature threshold value $T_{thc}$ (deg) (step S25).

As a result of heat dissipation from the coil of the motor 4, if the detected temperature $T_1$ is determined to be smaller than the third temperature threshold value $T_{th3}$ and if the detected temperature $T_2$ is determined to be smaller than the third temperature threshold value $T_{thc}$ in step S25 (namely, if YES in step S23), the setting of the microcomputer 11 is changed (restored) from the limited operation mode to the normal operation mode (step S27a). Then, the LED display unit 15 is turned off by the microcomputer 11 to notify the user of such a situation.

If the detected temperature $T_1$ is determined to be equal to or greater than the third temperature threshold value $T_{th3}$ in step S23 and if the detected temperature $T_2$ is determined to be equal to or greater than the third temperature threshold value $T_{thc}$ in step S25 (namely, if NO in step S23), the microcomputer 11 determines whether the trigger switch 5 is turned off (step S24) and if NO in step S24, the microcomputer 11 maintains the limited operation mode (step S22).

Even if the trigger switch 5 is turned on again while the microcomputer 11 is in the limited operation mode as noted just above, the microcomputer 11 does not come back to the normal operation mode unless the detected temperature $T_1$ becomes smaller than the third temperature threshold value $T_{th3}$ and the detected temperature $T_2$ becomes smaller than the third temperature threshold value $T_{thc}$.

If the trigger switch 5 is on (step S28a) while the microcomputer 11 is in the normal operation mode, the determination of step S21 is performed again.

The rechargeable electric power tool of the present embodiment can offer the following advantageous effect.

Upon changeover of the trigger switch 5, if the first calculated temperature increase rate ($\Delta T/\Delta t$) is determined to be greater than the second preset temperature increase rate ($\Delta T/\Delta t)_{s11}$ after the detected temperature $T_1$ has been determined to be greater than the fourth temperature threshold value $T_{th4}$ when it is not greater than $T_{th1}$ or if the second calculated temperature increase rate ($\Delta T/\Delta t$) is determined to be greater than the second preset temperature increase rate ($\Delta T/\Delta t)_{s12}$ after the detected temperature $T_2$ has been determined to be greater than the fourth temperature threshold value $T_{thd}$ when it is not greater than $T_{tha}$, the microcomputer 11 is set in the limited operation mode. As compared to the configuration of the second embodiment, the determination criteria for setting the microcomputer 11 in the limited operation mode further include the magnitude relation between the first calculated temperature increase rate ($\Delta T/\Delta t$) and the second preset temperature increase rate ($\Delta T/\Delta t)_{s11}$ after the detected temperature $T_1$ has been determined to be greater than the fourth temperature threshold value $T_{th4}$ when it is not greater than $T_{th1}$ and the magnitude relation between the second calculated temperature increase rate ($\Delta T/\Delta t$) and the second preset temperature increase rate ($\Delta T/\Delta t)_{s12}$ after the detected temperature $T_2$ has been determined to be greater than the fourth temperature threshold value $T_{thd}$ when it is not greater than $T_{tha}$. Unlike the configuration of the second embodiment, the microcomputer 11 is more rapidly set in the limited operation mode when a sharp increase in the temperature of the coil (or the motor 4) is detected in the temperature range between the fourth temperature threshold value $T_{th4}$ or $T_{thd}$ and the first temperature threshold value $T_{th1}$ or $T_{tha}$ than when a sharp increase in the temperature of the coil (or the motor 4) is detected in the temperature range between the second temperature threshold value $T_{th2}$ or $T_{thb}$ and the fourth temperature threshold value $T_{th4}$ or $T_{thd}$. This makes it possible to more effectively prevent the motor 4 from falling into an overload state.

The embodiments described above may be modified as follows.

In the first through third embodiments, if the setting of the microcomputer 11 is changed from the normal operation mode to the limited operation mode, the LED display unit 15 is turned on by the microcomputer 11 to notify a user of this mode change. The present invention is not limited thereto. Alternatively, the mode change may be notified to the user by a buzzing sound through the use of a buzzer device connected to the microcomputer 11.

Other technical concepts that can be grasped from the foregoing embodiments and modified example will be described below.

In the rechargeable electric power tool, the first temperature detection unit may be a thermistor screw-fixed to the contact point portion.

With this configuration, the screw-fixing makes it easy to attach the thermistor to the contact point portion and keeps the thermistor in a stably fixed state after its attachment. This makes it possible to reliably detect the temperature while utilizing the advantages, e.g., reduced size, of the thermistor.

In the rechargeable electric power tool, there is provided a notification unit connected to the motor control unit for, when the motor control unit is set in the limited operation mode, notifying a user of this mode setting by making a buzzing sound or emitting light. The motor control unit is configured to forcibly release the limited operation mode after a timer time $\Delta T_0$ has lapsed from the setting time of the limited operation mode.

With this configuration, if the motor control unit is set in the limited operation mode, the notification unit notifies a user (or an operator) of this mode setting by making a buzzing sound or emitting light. This enables the user to reliably recognize the fact that the motor control unit (or the power tool) is set in the limited operation mode. After a timer time $\Delta t_0$ has lapsed from the time point at which the motor control unit is set in the limited operation mode, the motor control unit returns from the limited operation mode to the normal operation mode regardless of the magnitude relation between the detected temperature corresponding to the temperature detection signal outputted from the first to third temperature detection units and the temperature threshold value. This makes it possible to save the electric power otherwise consumed by the notification unit and the motor control unit when the buzzing sound generation or the light emission in the notification unit lasts for a long time period due to the failure of the temperature detection unit.

Although the values of the preset temperature increase rate, the temperature threshold and the like are exemplified in the embodiments described above, but the present invention is not limited thereto. The present temperature increase rate, the temperature threshold value and the like may be varied as necessary.

While the invention has been shown and described with respect to the embodiments, it will be understood by those skilled in the art that various changes and modification may be made without departing from the scope of the invention as defined in the following claims.

What is claimed is:

1. A rechargeable electric power tool comprising a motor driven by a secondary battery as a power source, a switching element for regulating power supplied to the motor, a motor control unit for controlling rotation of the motor through the switching element, a lead wire for supplying a drive current to the motor therethrough and a trigger switch changed over by a user for turning on or off the drive current supplied to the motor through the lead wire, wherein a first temperature detection unit is arranged on the lead wire and a first temperature threshold value $T_{th1}$, a second temperature threshold value $T_{th2}$ lower than the $T_{th1}$, a first preset temperature increase rate ($\Delta T/\Delta t)_{s1}$ and a third temperature threshold value $T_{th3}$ lower than the $T_{th2}$ are set for the first temperature detection unit, wherein, based on a temperature detection signal outputted from the first temperature detection unit, the motor control unit calculates a first calculated temperature increase rate ($\Delta T/\Delta t$) by dividing a temperature elevation degree $\Delta T$ by a lapse time $\Delta t$, wherein, upon changeover of the trigger switch, the motor control unit determines magnitude relations between a detected temperature $T_1$ corresponding to the temperature detection signal outputted from the first temperature detection unit and the $T_{th1}$, the $T_{th2}$ and the $T_{th3}$, and a magnitude relation between the ($\Delta T/\Delta t$) and the ($\Delta T/\Delta t$)$_{s1}$, wherein, if the detected temperature $T_1$ is determined to be greater than the $T_{th1}$ or if the ($\Delta T/\Delta t$) is determined to be greater than the ($\Delta T/\Delta t$)$_{s1}$ after the detected temperature $T_1$ has been determined to be greater than the $T_{th2}$ and to be equal to or smaller than the $T_{th1}$, the motor control unit is set in a limited operation mode in which the motor control unit stops rotation of the motor or in which the revolution number of the motor is limited to a predetermined value or less, and wherein, if the detected temperature $T_1$ is determined to be smaller than the $T_{th3}$, the motor control unit releases the limited operation mode.

2. The rechargeable electric power tool of claim 1, further comprising a switch block for accommodating the trigger switch, the first temperature detection unit being arranged in a contact point portion between the lead wire and the switch block.

3. The rechargeable electric power tool of claim 2, the first temperature detection unit is a thermistor screw-fixed to the contact point portion.

4. The rechargeable electric power tool of claim 1, further comprising a notification unit connected to the motor control unit for, when the motor control unit is set in the limited operation mode, notifying a user of this mode setting by making a buzzing sound or emitting light, wherein the motor control unit is configured to forcibly release the limited operation mode after a timer time $\Delta t_0$ has lapsed from the setting time of the limited operation mode.

5. The rechargeable electric power tool of claim 1, wherein the motor includes a rotor, a coil, a stator and a motor case for accommodating the rotor, the coil and the stator, wherein a second temperature detection unit is arranged in the motor case and a first temperature threshold value $T_{tha}$, a second temperature threshold value $T_{thb}$ lower than the $T_{tha}$, a first preset temperature increase rate ($\Delta T/\Delta t$)$_{s2}$ and a third temperature threshold value $T_{thc}$ lower than the $T_{thb}$ are set for the second temperature detection unit, wherein, based on a temperature detection signal outputted from the second temperature detection unit, the motor control unit calculates a second calculated temperature increase rate ($\Delta T/\Delta t$) by dividing a temperature elevation degree $\Delta T$ by a lapse time $\Delta t$, wherein, upon changeover of the trigger switch, the motor control unit determines magnitude relations between a detected temperature $T_1$ corresponding to the temperature detection signal outputted from the first temperature detection unit and the $T_{th1}$, the $T_{th2}$ and the $T_{th3}$, a magnitude relation between the first calculated temperature increase rate ($\Delta T/\Delta t$) and the ($\Delta T/\Delta t$)$_{s1}$, magnitude relations between a detected temperature $T_2$ corresponding to the temperature detection signal outputted from the second temperature detection unit and the $T_{tha}$, the $T_{thb}$ and the $T_{thd}$, and a magnitude relation between the second calculated temperature increase rate ($\Delta T/\Delta t$) and the ($\Delta T/\Delta t$)$_{s2}$, wherein, if the detected temperature $T_1$ is determined to be greater than the $T_{th1}$ or the detected temperature $T_2$ is determined to be greater than the $T_{tha}$, or if the first calculated temperature increase rate ($\Delta T/\Delta t$) is determined to be greater than the ($\Delta T/\Delta t$)$_{s1}$ after the detected temperature $T_1$ has been determined to be greater than the $T_{th2}$ and to be equal to or smaller than the $T_{th1}$ or the second calculated temperature increase rate ($\Delta T/\Delta t$) is determined to be greater than the ($\Delta T/\Delta t$)$_{s2}$ after the detected temperature $T_2$ has been determined to be greater than the $T_{thb}$ and to be equal to or smaller than the $T_{tha}$, the motor control unit sets itself in the limited operation mode, and wherein, if the detected temperature $T_1$ is determined to be smaller than the $T_{th3}$ and if the detected temperature $T_2$ is determined to be smaller than the $T_{thc}$ the motor control unit releases the limited operation mode.

6. The rechargeable electric power tool of claim 5, further comprising a notification unit connected to the motor control unit for, when the motor control unit is set in the limited operation mode, notifying a user of this mode setting by making a buzzing sound or emitting light, wherein the motor control unit is configured to forcibly release the limited operation mode after a timer time $\Delta t_0$ has lapsed from the setting time of the limited operation mode.

7. The rechargeable electric power tool of claim 5, wherein fourth temperature threshold values $T_{th4}$ and $T_{thd}$ respectively higher than the $T_{th2}$ and $T_{thb}$ but lower than the $T_{th1}$ and $T_{tha}$ and second preset temperature increase rates ($\Delta T/\Delta t$)$_{s11}$ and ($\Delta T/\Delta t$)$_{s12}$ respectively smaller than the ($\Delta T/\Delta t$)$_{s1}$ and ($\Delta T/\Delta t$)$_{s2}$ are set for the first temperature detection unit and the second temperature detection unit, wherein, upon changeover of the trigger switch, the motor control unit determines magnitude relations between the detected temperatures $T_1$ and $T_2$ corresponding to the temperature detection signals outputted from the first temperature detection unit and the second temperature detection unit and the $T_{th4}$ and $T_{thd}$, and magnitude relations between the first and second calculated temperature increase rates ($\Delta T/\Delta t$) and the increase rates ($\Delta T/\Delta t$)$_{s11}$ and ($\Delta T/\Delta t$)$_{s12}$, wherein, if the first calculated temperature increase rate ($\Delta T/\Delta t$) is determined to be greater than the ($\Delta T/\Delta t$)$_{s11}$ after the detected temperature $T_1$ has been determined to be greater than the $T_{th4}$ and to be equal to or smaller than the $T_{th1}$ or if the second calculated temperature increase rate ($\Delta T/\Delta t$) is determined to be greater than the ($\Delta T/\Delta t$)$_{s12}$ after the detected temperature $T_2$ has been determined to be greater than the $T_{thd}$ and to be equal to or smaller than the $T_{tha}$, the motor control unit sets itself in the limited operation mode, and wherein, if the detected temperature $T_1$ is determined to be smaller than the $T_{th3}$ and if the detected temperature $T_2$ is determined to be smaller than the $T_{thc}$, the motor control unit releases the limited operation mode.

8. The rechargeable electric power tool of claim 7, further comprising a notification unit connected to the motor control unit for, when the motor control unit is set in the limited operation mode, notifying a user of this mode setting by making a buzzing sound or emitting light, wherein the motor control unit is configured to forcibly release the limited operation mode after a timer time $\Delta t_0$ has lapsed from the setting time of the limited operation mode.

* * * * *